(12) United States Patent
Kim et al.

(10) Patent No.: US 11,466,695 B2
(45) Date of Patent: Oct. 11, 2022

(54) MOTOR ASSEMBLY AND METHOD FOR MANUFACTURING THE SAME

(71) Applicant: LG Electronics Inc., Seoul (KR)

(72) Inventors: Sunggi Kim, Seoul (KR); Byungjik Kim, Seoul (KR); Eunji Hwang, Seoul (KR); Jisu Hwang, Seoul (KR)

(73) Assignee: LG Electronics Inc., Seoul (KR)

( * ) Notice: Subject to any disclaimer, the term of this patent is extended or adjusted under 35 U.S.C. 154(b) by 121 days.

(21) Appl. No.: 16/821,380

(22) Filed: Mar. 17, 2020

(65) Prior Publication Data

US 2020/0400148 A1 Dec. 24, 2020

(30) Foreign Application Priority Data

Jun. 21, 2019 (KR) .......................... 10-2019-0074018

(51) Int. Cl.
*F04D 29/056* (2006.01)
*F04D 25/06* (2006.01)
(Continued)

(52) U.S. Cl.
CPC ....... *F04D 29/056* (2013.01); *F04D 13/0633* (2013.01); *F04D 25/06* (2013.01);
(Continued)

(58) Field of Classification Search
CPC ........ H02K 5/1732; H02K 7/083; H02K 9/06; H02K 5/20; H02K 5/207; H02K 5/161;
(Continued)

(56) References Cited

U.S. PATENT DOCUMENTS 2,888,193 A * 5/1959 Greenwald ............. F25B 1/053
415/199.1
4,545,741 A 10/1985 Tomioka et al.
(Continued)

FOREIGN PATENT DOCUMENTS

AU 2018354513 2/2020
DE 1055107 4/1959
(Continued)

OTHER PUBLICATIONS

TW Office Action in Taiwanese Appln. No. 109116746, dated May 14, 2021, 16 pages (with English translation).
(Continued)

*Primary Examiner* — Peter J Bertheaud
(74) *Attorney, Agent, or Firm* — Fish & Richardson P.C.

(57) ABSTRACT

A motor assembly includes a rolling bearing installed on a rotation shaft between an impeller and a rotor to support a first support of the rotation shaft, and a motor housing having a stator. The motor housing has a gas bearing bracket for accommodating a second support of the rotation shaft disposed at a side opposite to the first support with respect to the rotor. The motor assembly includes a gas bearing assembly in the gas bearing bracket to support rotation of the second support of the rotation shaft. The gas bearing assembly includes a gas bearing for surrounding the second support. The gas bearing is spaced apart from the second support of the rotation shaft to define a gap therebetween when the rotation shaft rotates. The gas bearing assembly includes an elastic member interposed between the gas bearing bracket and the gas bearing to elastically support the gas bearing.

19 Claims, 12 Drawing Sheets

(51) Int. Cl.
| | |
|---|---|
| H02K 5/173 | (2006.01) |
| H02K 7/08 | (2006.01) |
| F16C 19/06 | (2006.01) |
| H02K 5/20 | (2006.01) |
| H02K 9/06 | (2006.01) |
| F04D 29/043 | (2006.01) |
| F04D 29/049 | (2006.01) |
| F04D 29/18 | (2006.01) |
| F04D 29/40 | (2006.01) |
| H02K 15/14 | (2006.01) |
| F04D 29/059 | (2006.01) |
| F04D 29/057 | (2006.01) |
| H02K 5/16 | (2006.01) |
| F04D 25/08 | (2006.01) |
| F04D 29/02 | (2006.01) |
| F04D 29/058 | (2006.01) |
| F04D 29/047 | (2006.01) |
| F04D 29/05 | (2006.01) |
| F04D 13/06 | (2006.01) |
| F04D 29/42 | (2006.01) |

(52) U.S. Cl.
CPC ....... *F04D 25/0606* (2013.01); *F04D 25/082* (2013.01); *F04D 29/023* (2013.01); *F04D 29/043* (2013.01); *F04D 29/047* (2013.01); *F04D 29/049* (2013.01); *F04D 29/05* (2013.01); *F04D 29/057* (2013.01); *F04D 29/058* (2013.01); *F04D 29/059* (2013.01); *F04D 29/0563* (2013.01); *F04D 29/0566* (2013.01); *F04D 29/18* (2013.01); *F04D 29/40* (2013.01); *F04D 29/4226* (2013.01); *F16C 19/06* (2013.01); *H02K 5/16* (2013.01); *H02K 5/161* (2013.01); *H02K 5/173* (2013.01); *H02K 5/1732* (2013.01); *H02K 5/1735* (2013.01); *H02K 5/20* (2013.01); *H02K 5/207* (2021.01); *H02K 7/08* (2013.01); *H02K 7/083* (2013.01); *H02K 9/06* (2013.01); *H02K 15/14* (2013.01); *F16C 2360/44* (2013.01); *F16C 2380/26* (2013.01)

(58) Field of Classification Search
CPC  H02K 7/08; H02K 5/16; H02K 5/173; H02K 5/1735; H02K 15/14; F04D 29/058; F04D 29/059; F04D 29/056; F04D 29/0566; F04D 29/0563; F04D 25/0606; F04D 29/5806; F04D 25/06; F04D 25/082; F04D 29/057; F04D 29/023; F04D 29/047; F04D 13/0633; F04D 29/4226; F04D 29/05; F04D 29/043; F04D 29/049; F04D 29/18; F04D 29/40; F16C 2380/26; F16C 2360/44; F16C 19/06

See application file for complete search history.

(56) References Cited

U.S. PATENT DOCUMENTS

| | | | |
|---|---|---|---|
| 4,701,651 | A | 10/1987 | Tanaka |
| 7,704,056 | B2 * | 4/2010 | Masoudipour ...... F04D 25/0606 62/505 |
| 2002/0134082 | A1 | 9/2002 | Bolz et al. |
| 2011/0243762 | A1 | 10/2011 | Daikoku et al. |
| 2011/0311350 | A1 * | 12/2011 | Takahashi ........... F16C 33/6622 415/170.1 |
| 2015/0104123 | A1 | 4/2015 | Ertas et al. |
| 2018/0076682 | A1 * | 3/2018 | Hwang ................. H02K 5/207 |
| 2018/0363669 | A1 | 12/2018 | Sullivan |
| 2019/0170190 | A1 | 6/2019 | Ryu |

FOREIGN PATENT DOCUMENTS

| | | |
|---|---|---|
| DE | 202011003588 | 6/2011 |
| EP | 0566088 | 10/1993 |
| EP | 3290714 | 3/2018 |
| EP | 3301307 | 4/2018 |
| JP | 2008067552 | 3/2008 |
| JP | 2015038363 | 2/2015 |
| JP | 2017106527 | 6/2017 |
| KR | 101852111 | 4/2018 |
| KR | 101967552 | 4/2019 |
| TW | I421417 | 1/2014 |
| WO | WO2009145745 | 12/2009 |
| WO | WO2017199695 | 11/2017 |
| WO | WO2019083238 | 5/2019 |

OTHER PUBLICATIONS

AU Office Action in Australian Appln. No. 2020203500, dated Nov. 18, 2020, 7 pages.
EP extended European search report in European Appln. No. 20178194.5, dated Nov. 16, 2020, 13 pages.
Stefani et al., "Comparative Analysis of Bearings for Micro-GT: An Innovative Arrangement," Bearing Technology, Chapter 1, dated May 31, 2017, 26 pages.

* cited by examiner

MOTOR ASSEMBLY AND METHOD FOR MANUFACTURING THE SAME

CROSS-REFERENCE TO RELATED APPLICATION

This application claims the benefit of Korean Patent Application No. 10-2019-0074018, filed on Jun. 21, 2019, which is hereby incorporated by reference as when fully set forth herein.

BACKGROUND

Field

Embodiments of the present disclosure relate to a motor assembly and a method for manufacturing the same, and more particularly, to a motor assembly having a bearing for supporting a rotation shaft and a method for manufacturing the same.

Discussion of the Related Art

A motor may be installed in a household appliance such as a cleaner, a hair dryer, or the like to function as a driving source for generating a rotational force. The motor may be coupled to a fan, and in this case, the rotational force of the motor is transmitted to the fan to generate airflow based on rotation of the fan.

The cleaner or the hair dryer mentioned above as an example operates in a state of being lifted by a hand of a user. Thus, it is needless to describe additionally that manufacturing the cleaner or the hair dryer lighter weight and smaller volume is a core value of recent engineering, provided that a necessary function is improved or at least kept the same.

In manufacturing of general household appliances in addition to the cleaner and the hair dryer, weight lightening and miniaturization are required while improving or at least maintaining inherent functions thereof. This is to maximize a user convenience, which is an essential item to secure differentiation from competitive products in a fierce market.

As an example, because an inherent function of the cleaner is to suck dust, improving the cleaner is to enhance a suction power thereof. In other words, in order to improve the function of the cleaner, it is necessary to improve an output of the motor which has an absolute influence on the suction power.

For example, the output of the motor may be improved by increasing a revolution per minute (RPM) of the motor. However, when the revolution per minute of the motor is set to be high, it is required to stably support a rotation shaft of the motor rotating at a high speed. In other words, a durability of a bearing supporting the rotation of the rotation shaft must also be strengthened, so that the output of the motor may be improved and a life of the cleaner may be extended.

A life of the bearing is determined by many factors, but a bearing size is one of the most important factors in the life of the bearing. For example, the larger the bearing size, the longer the life of the bearing. However, as the size of the bearing increases, sizes of other components of the motor accommodating the bearing therein also increase, which inevitably results in the opposite of the trends of the miniaturization and the weight lightening. On the contrary, when the bearing size is designed to be small for the miniaturization and the weight lightening, the life of the bearing is shortened. Thus, the rotation shaft of the motor may not be able to be stably supported for a long time.

In summary, the smaller the size of the bearing is, the better it is to realize the miniaturization and the weight lightening of the motor, but the larger the bearing size is, the better it is to secure the long life of the bearing. Therefore, in order to achieve the miniaturization and the weight lightening of the motor, and to secure the life of the bearing as long as possible, an appropriate compromise on the size of the bearing is required.

Conventionally, it was common to support both sides of the rotation shaft with two bearings to speed up the motor and maintain a life, a performance, and a reliability. In addition, it was common that the bearings respectively supporting the both sides of the rotation shaft have the same size.

In a case of a structure in which the bearings support the both sides of the rotation shaft, when a size of the bearing is extended to extend a life of the bearing, a size of a housing that accommodates the bearing therein also increases, so that miniaturization and weight lightening may not be expected.

In one example, designing at least one of the two bearings to have an outer diameter smaller than an inner diameter of a stator is a better choice for improved manufacturing convenience and cost savings. However, reducing the size of the bearing means shortening of the life of the bearing.

As such, it is advantageous to increase the size of the bearing in order to increase the life of the bearing. On the other hand, in order to increase a convenience of assembly, to prevent increase of assembly costs, and to pursue the miniaturization and the weight lightening of the motor, the size of the bearing must be smaller than the inner diameter of the stator. In this case, there is a trade-off point that the life of the bearing is inevitably shortened.

In addition, in a structure in which each bearing is installed at each side of the rotation shaft around a rotor, when an alignment between the bearings is poor, the life of the bearing may be significantly reduced.

SUMMARY

As described above, the prior art lacks awareness of the problem of the assembly costs, and only discloses the concept of supporting the both sides of the rotation shaft with the two bearings to stably support the rotation shaft. The prior art does not fully describe the problem that the above-mentioned trade-off point exists when attempting to secure the sufficient bearing life while pursuing the miniaturization and the weight lightening of the motor.

A purpose of embodiments of the present disclosure is to reflect a trend of miniaturization and weight lightening of a motor assembly installed in a home appliance.

Further, a purpose of embodiments of the present disclosure is to realize a bearing structure that may secure a sufficient life by improving reliability and durability in supporting a rotation shaft of a motor rotating at a high speed.

Further, a purpose of embodiments of the present disclosure is to provide a motor assembly and a method for manufacturing the same that may realize convenience and cost reduction during assembly.

Further, a purpose of embodiments of the present disclosure is to provide a motor assembly and a method for manufacturing the same that may simultaneously realize miniaturization and weight lightening of the motor assembly, improvement of reliability and durability of a bearing structure, and cost reduction during assembly.

Purposes of the present disclosure are not limited to the above-mentioned purpose. Other purposes and advantages of the present disclosure as not mentioned above may be understood from following descriptions and more clearly understood from embodiments of the present disclosure. Further, it will be readily appreciated that the purposes and advantages of the present disclosure may be realized by features and combinations thereof as disclosed in the claims.

In a motor assembly and a method for manufacturing the same according to embodiments of the present disclosure to solve the problems as described above, a portion of a rotation shaft at a side opposite to an impeller relative to a rotor is supported by a gas bearing having a theoretically infinite life and at the same time having a volume smaller than that of a general rolling bearing.

Further, a predetermined space is defined between a gas bearing bracket and a gas bearing assembly, and an elastic member is disposed in the space, so that when the rotation shaft rotates, a rolling bearing and a gas bearing are automatically aligned with each other.

Particular embodiments described herein include a motor assembly that includes a motor housing, a rotation shaft, an impeller, a rotor, a stator, a rolling bearing, a gas bearing bracket, and a gas bearing assembly. The motor housing may have an inner circumferential face. The rotation shaft may have a first support portion and a second support portion. The impeller may be mounted on the rotation shaft between the first support portion and the second support portion. The rotor may be mounted on the rotation shaft and spaced apart from the impeller axially along a rotational axis of the rotation shaft. The stator may surround the rotor and be spaced apart from the rotor radially relative to the rotational axis of the rotation shaft. The stator may be mounted on the inner circumferential face of the motor. The rolling bearing may be mounted on the rotation shaft between the impeller and the rotor and rotatably support the first support portion of the rotation shaft. The gas bearing bracket may be disposed in the motor housing and receive the second support portion of the rotation shaft. The gas bearing assembly may be received in the gas bearing bracket and rotatably support the second support portion of the rotation shaft. The gas bearing assembly may include a gas bearing and an elastic member. The gas bearing may surround the second support portion of the rotation shaft and be configured to be spaced apart from the second support portion of the rotation shaft to define a gap between the gas bearing and the second support portion during rotation of the rotation shaft. The elastic member may be disposed between the gas bearing bracket and the gas bearing to elastically support the gas bearing.

In some implementations, the system can optionally include one or more of the following features. The rolling bearing may be configured to rotatably support the first support portion axially and radially relative to the rotational axis. The gas bearing assembly may be configured to rotatably support the second support portion radially relative to the rotational axis of the rotation shaft. The gas bearing bracket may include a first step at least partially covering the gas bearing assembly radially relative to the rotational axis of the rotation axis such that the gas bearing assembly is prevented from being removed axially from the gas bearing bracket along a first direction from the rotor toward the impeller. The gas bearing assembly may include a bush that surrounds the gas bearing, wherein the gas bearing is press-fitted into an inner circumferential face of the bush, and a fixing groove defined in an outer circumferential face of the bush and configured to seat the elastic member therein. The first step of the gas bearing bracket may cover at least a portion of the bush radially with respect to the rotational axis of the rotation shaft. The fixing groove may include a first sub-fixing groove and a second sub-fixing groove axially spaced apart from the first sub-fixing groove. The elastic member may include a first sub-elastic member seated in the first sub-fixing groove, and a second sub-elastic member seated in the second sub-fixing groove. An inner diameter of the first step may be smaller than an outer diameter of the bush, and is larger than an inner diameter of the bush. The gas bearing may be made of one or more materials including at least one of aluminum, brass, bronze, or a nickel-chromium alloy. The bush may be made of one or more materials including a synthetic resin. The motor assembly may include a stopper coupled with the gas bearing bracket and configured to provide a space within which the gas bearing assembly moves axially along the rotational axis of the rotation shaft. The stopper may include a second step that at least partially covers the gas bearing assembly radially with respect to the rotational axis of the rotation shaft and configured to prevent the gas bearing assembly from being removed axially from the gas bearing bracket along a second direction from the impeller toward the rotor. An inner diameter of the stopper may be equal to an inner diameter of the gas bearing bracket. An inner diameter of the second step may be smaller than an outer diameter of the bush, and larger than an inner diameter of the bush. The gas bearing bracket may include an installation groove recessed from an inner circumferential face of the gas bearing bracket radially relative to the rotational axis of the rotation shaft, and a snap ring engaged with the installation groove. The snap ring may be elastically deformable by an externally applied force. The snap ring may have a diameter equal to or smaller than a diameter of the inner circumferential face of the gas bearing bracket. The snap ring may be configured to a predetermined clearance space in which the gas bearing assembly moves axially along the rotational axis of the rotation shaft. At least a portion of the snap ring that is not deformed by the externally applied force may at least partially cover the gas bearing assembly radially with respect to the rotational axis of the rotation shaft such that the gas bearing assembly is prevented from being removed axially from the gas bearing bracket along the rotational axis of the rotation shaft.

Particular embodiments described herein include a method for manufacturing a motor assembly. The method may include mounting a rolling bearing on a first portion of the rotation shaft; mounting a rotor on a second portion of the rotation shaft; mounting a gas bearing on an inner circumferential face of a bush and installing an elastic member on an outer circumferential face of the bush to assembly a gas bearing assembly; inserting the gas bearing assembly into a gas bearing bracket; and inserting the rotation shaft into the gas bearing assembly such that the second portion of the rotation shaft passes through the gas bearing along a first direction from the first portion to the second portion of the rotation shaft while the rolling bearing and the rotor are mounted on the rotation shaft.

In some implementations, the system can optionally include one or more of the following features. The inserting of the gas bearing assembly into the gas bearing bracket may include inserting the gas bearing assembly into the gas bearing bracket in a second direction from the second portion to the first portion of the rotation shaft. The method may include, after the inserting of the gas bearing assembly into the gas bearing bracket, arranging a stopper toward the gas bearing bracket in a second direction from the second portion to the first portion of the rotation shaft; and fastening the stopper to the gas bearing bracket. The method may include, after the inserting of the gas bearing assembly into the gas bearing bracket, arranging a snap ring toward the gas bearing bracket to mount the snap ring in an installation groove recessed from an inner circumferential face of the gas bearing bracket. The installing of the snap ring in the installation groove of the gas bearing bracket may include compressing the snap ring by pressing the snap ring such that a diameter of the snap ring becomes equal to or smaller than an inner diameter of the inner circumferential face of the gas bearing bracket; guiding the compressed snap ring toward the installation groove along the inner circumferential face of the gas bearing bracket; and expanding the snap ring to permit for the snap ring to be inserted into the installation groove, such that the snap ring is fixed in the installation groove. The method may include, before the mounting of the rotation shaft into the gas bearing assembly, seating the rolling bearing mounted on the rotation shaft in a rolling bearing bracket; mounting a diffuser on the rolling bearing bracket; mounting an impeller on the first portion of the rotation shaft to be axially opposite to the rotor relative to the rolling bearing; and mounting a stator on an inner circumferential face of a motor housing. The method may include, after the mounting of the rotation shaft into the gas bearing assembly, fastening an inlet body with the motor housing, wherein the inlet body is configured to receive the first portion of the rotation shaft, the impeller, the rolling bearing, the rolling bearing bracket, and the diffuser therein. The motor housing may be configured to receive the second portion of the rotation shaft, the rotor, the stator, and the gas bearing assembly therein.

One aspect of the present disclosure proposes a motor assembly including a rotation shaft, an impeller installed on the rotation shaft, a rotor mounted on the rotation shaft to be spaced apart from the impeller by a predetermined spacing along an axial direction of the rotation shaft, a stator surrounding an outer face of the rotor such that the stator is spaced apart from the rotor by a predetermined spacing along a radial direction of the rotation shaft, a rolling bearing installed on the rotation shaft and installed between the impeller and the rotor to support a first support of the rotation shaft, a motor housing having the stator mounted on an inner circumferential face thereof, wherein the motor housing has a gas bearing bracket disposed therein for accommodating therein a second support of the rotation shaft disposed at a side opposite to the first support with respect to the rotor along the axial direction of the rotation shaft, and a gas bearing assembly accommodated in the gas bearing bracket to support rotation of the second support of the rotation shaft, wherein the gas bearing assembly includes a gas bearing for surrounding an outer circumferential face of the second support, wherein the gas bearing is spaced apart from the second support of the rotation shaft interposing a predetermined gap defined therebetween when the rotation shaft rotates, and an elastic member interposed between an inner circumferential face of the gas bearing bracket and an outer circumferential face of the gas bearing to elastically support the gas bearing.

In one implementation, the rolling bearing may support rotation of the first support in the axial direction and in the radial direction of the rotation shaft, and the gas bearing assembly may support the rotation of the second support in the radial direction of the rotation shaft.

In one implementation, the gas bearing bracket may include a first step overlapping with the gas bearing assembly with respect to the axial direction of the rotation shaft such that the gas bearing assembly is prevented from being detached from the gas bearing bracket along a first direction from the rotor toward the impeller with respect to the axial direction of the rotation shaft.

In one implementation, the gas bearing assembly may further include a bush for surrounding the outer circumferential face of the gas bearing, wherein the outer circumferential face of the gas bearing is press-fitted and fixed on an inner circumferential face of the bush, and a fixing groove for seating the elastic member therein is defined in an outer circumferential face of the bush, wherein at least a portion of the bush may overlap with the first step with respect to the axial direction of the rotation shaft.

In one implementation, the fixing groove may include a first sub-fixing groove and a second sub-fixing groove defined to be spaced apart from each other by a predetermined spacing along the axial direction of the rotation shaft, and the elastic member may include a first sub-elastic member seated in the first sub-fixing groove, and a second sub-elastic member seated in the second sub-fixing groove.

In one implementation, an inner diameter of the first step may be smaller than an outer diameter of the bush, and larger than an inner diameter of the bush.

In one implementation, the gas bearing may contain at least one of aluminum, brass, bronze, and a nickel-chromium alloy, and the bush may contain a synthetic resin.

In one implementation, the motor assembly may further include a fixed member coupled with the gas bearing bracket to provide a predetermined space for allowing the gas bearing assembly moves along the axial direction of the rotation shaft, wherein the fixed member includes a second step overlapping the gas bearing assembly with respect to the axial direction of the rotation shaft to prevent the gas bearing assembly from being detached from the gas bearing bracket along a second direction from the impeller toward the rotor.

In one implementation, an inner diameter of the fixed member may substantially correspond to an inner diameter of the gas bearing bracket, and an inner diameter of the second step may be smaller than an outer diameter of the bush, and larger than an inner diameter of the bush.

In one implementation, the gas bearing bracket may include an installation groove recessed by a predetermined width along the radial direction of the rotation shaft from an inner circumferential face of the gas bearing bracket, and a snap ring installed in the installation groove.

In one implementation, the snap ring may be elastically deformable between a compressed state of being compressed by an externally applied force and a normal state of being expanded from the compressed state as the externally applied force is removed.

In one implementation, the snap ring may have a diameter substantially corresponding to or smaller than a diameter of the inner circumferential face of the gas bearing bracket.

In one implementation, the snap ring may provide a predetermined clearance space for allowing the gas bearing assembly moves along the axial direction of the rotation shaft, wherein, in the normal state, at least a portion of the snap ring may overlap the gas bearing assembly with respect to the axial direction of the rotation shaft such that the gas bearing assembly is prevented from being detached from the gas bearing bracket along the axial direction of the rotation shaft.

Another aspect of the present disclosure proposes a method for manufacturing a motor assembly including installing a rolling bearing on a rotation shaft at one side of the rotation shaft and installing a rotor on the rotation shaft at the other side of the rotation shaft, installing a gas bearing on an inner circumferential face of a bush and installing an elastic member on an outer circumferential face of the bush to assembly a gas bearing assembly, inserting the gas bearing assembly into a gas bearing bracket, and installing the rotation shaft into the gas bearing assembly such that the other end of the rotation shaft passes through the gas bearing along a direction from the one side to the other side of the rotation shaft while the rolling bearing and the rotor are installed on the rotation shaft.

In one implementation, the inserting of the gas bearing assembly into the gas bearing bracket may include inserting the gas bearing assembly into the gas bearing bracket in a direction from the other side to the one side of the rotation shaft.

In one implementation, the method may further include, after the inserting of the gas bearing assembly into the gas bearing bracket, approaching the fixed member toward the gas bearing bracket in a direction from the other side to the one side of the rotation shaft to fasten the fixed member to the gas bearing bracket.

In one implementation, the method may further include, after the inserting of the gas bearing assembly into the gas bearing bracket, approaching a snap ring toward the gas bearing bracket to install the snap ring in an installation groove recessed by a predetermined width along a radial direction of the rotation shaft from an inner circumferential face of the gas bearing bracket.

In one implementation, the installing of the snap ring in the installation groove of the gas bearing bracket may include compressing the snap ring by pressing the snap ring such that a diameter of the snap ring becomes substantially corresponding to or smaller than an inner diameter of the inner circumferential face of the gas bearing bracket, guiding the compressed snap ring toward the installation groove along the inner circumferential face of the gas bearing bracket, and expanding the snap ring again as the snap ring is inserted into the installation groove, and fixing the snap ring in the installation groove.

In one implementation, the method may further include, before the installing of the rotation shaft into the gas bearing assembly, seating the rolling bearing installed on the rotation shaft in a rolling bearing bracket, installing a diffuser on the rolling bearing bracket, installing an impeller on the rotation shaft at the one side of the rotation shaft to be opposite to the rotor relative to the rolling bearing with respect to an axial direction of the rotation shaft, and installing a stator on an inner circumferential face of a motor housing.

In one implementation, the method may further include, after the installing of the rotation shaft into the gas bearing assembly, fastening an inlet body for accommodating the one side of the rotation shaft, the impeller, the rolling bearing, the rolling bearing bracket, and the diffuser therein with the motor housing for accommodating the other side of the rotation shaft, the rotor, the stator, and the gas bearing assembly therein.

The features of the above-described implantations may be combined with other embodiments as long as they are not contradictory or exclusive to each other.

Effects of the present disclosure are as follows but are limited thereto.

According to the motor assembly and the method for manufacturing the same according to embodiments of the present disclosure as described above, a portion of the rotation shaft at a side opposite to the impeller relative to the rotor is supported by the gas bearing having the theoretically infinite life and at the same time having the volume smaller than that of the general rolling bearing, so that the lives of the bearings are sufficiently secured, and at the same time, the trend of the miniaturization and the weight lightening of the motor assembly may be reflected.

Further, according to the motor assembly and the method for manufacturing the same according to embodiments of the present disclosure as described above, the predetermined space is defined between the gas bearing bracket and the gas bearing assembly, and the elastic member is disposed in the space, so that when the rotation shaft rotates, the rolling bearing and the gas bearing are automatically aligned with each other to prevent the shortening of the lives of the bearings due to the misalignment.

Further, according to the motor assembly and the method for manufacturing the same according to embodiments of the present disclosure as described above, the both sides of the rotation shaft are respectively supported by the bearings along the axial direction of the rotation shaft, so that the rotation shaft that rotates at the high speed may be stably supported, thereby ensuring reliability and durability of the bearing structure.

Further, according to the motor assembly and the method for manufacturing the same according to embodiments of the present disclosure as described above, in determining the size of the bearing, it is not necessary to consider the inner diameter of the stator, so that the size of the bearing may be freely selected based on the required performance of the motor assembly.

Further, according to the motor assembly and the method for manufacturing the same according to embodiments of the present disclosure as described above, the outer diameter of the portion of the rotation shaft on which the gas bearing is installed may be the substantially the same as the outer diameter of another portion of the rotation shaft on which the rotor is installed, so that the rigidity of the rotation shaft may be further improved.

BRIEF DESCRIPTION OF DRAWINGS

Embodiments of the present disclosure may be easily understood by a combination of a following detailed description and accompanying drawings. Further, reference numerals refer to structural elements.

DETAILED DESCRIPTION

Figure 1:
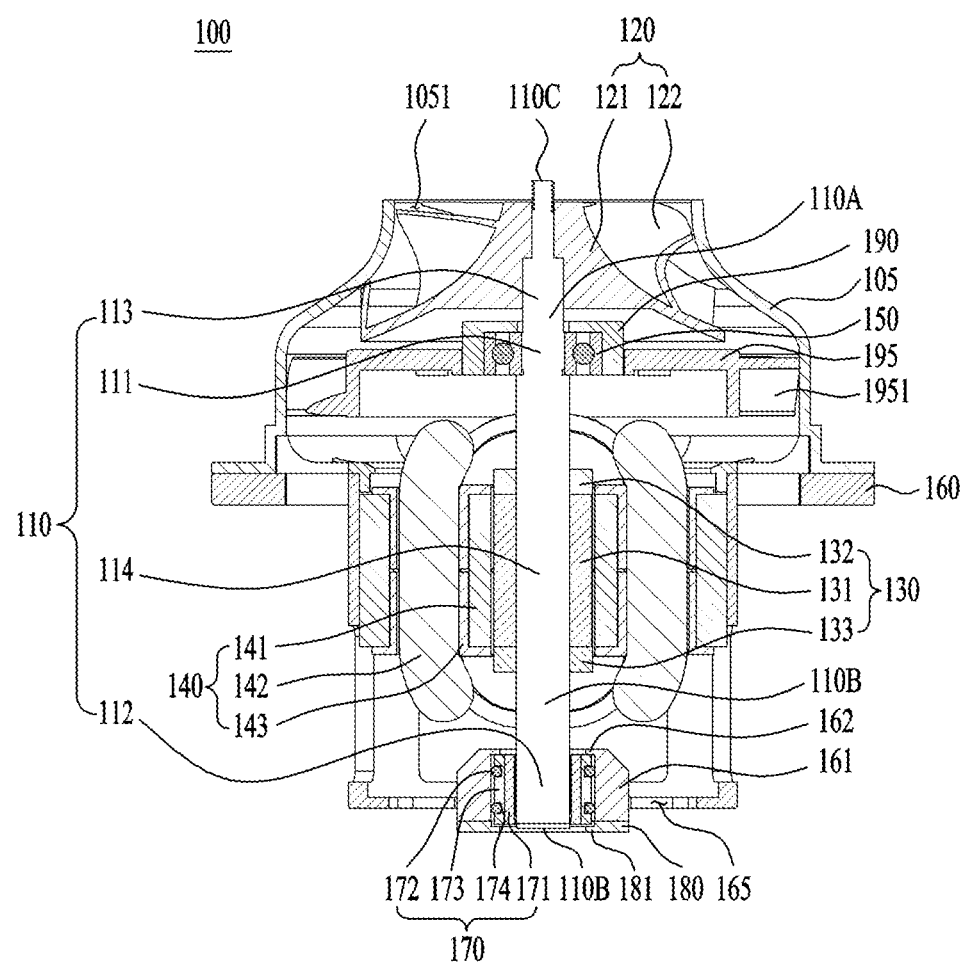
FIG. 1 is a cross-sectional view illustrating each component of a motor assembly according to an embodiment of the present disclosure.

For simplicity and clarity of illustration, elements in the figures are not necessarily drawn to scale. The same reference numbers in different figures denote the same or similar elements, and as such perform similar functionality. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Examples of various embodiments are illustrated and described further below. It will be understood that the description herein is not intended to limit the claims to the specific embodiments described. On the contrary, it is intended to cover alternatives, modifications, and equivalents as may be included within the spirit and scope of the present disclosure as defined by the appended claims.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises", "comprising", "includes", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expression such as "at least one of" when preceding a list of elements may modify the entire list of elements and may not modify the individual elements of the list.

It will be understood that, although the terms "first", "second", "third", and so on may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

In addition, it will also be understood that when a first element or layer is referred to as being present "on" or "beneath" a second element or layer, the first element may be disposed directly on or beneath the second element or may be disposed indirectly on or beneath the second element with a third element or layer being disposed between the first and second elements or layers. It will be understood that when an element or layer is referred to as being "connected to", or "coupled to" another element or layer, it may be directly on, connected to, or coupled to the other element or layer, or one or more intervening elements or layers may be present. In addition, it will also be understood that when an element or layer is referred to as being "between" two elements or layers, it may be the only element or layer between the two elements or layers, or one or more intervening elements or layers may be present.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 2:
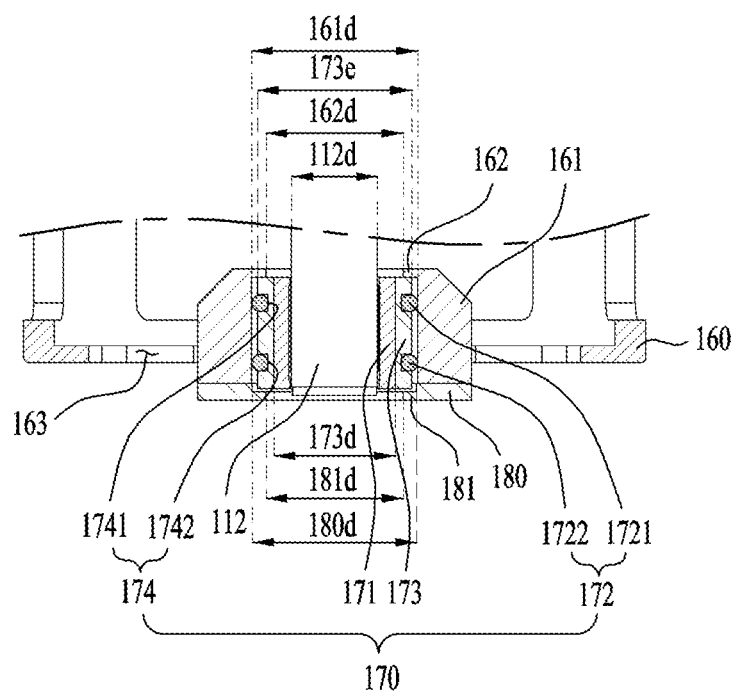
FIG. 2 is an enlarged cross-sectional view enlarging a portion of the motor assembly shown in FIG. 1.
Figure 3:
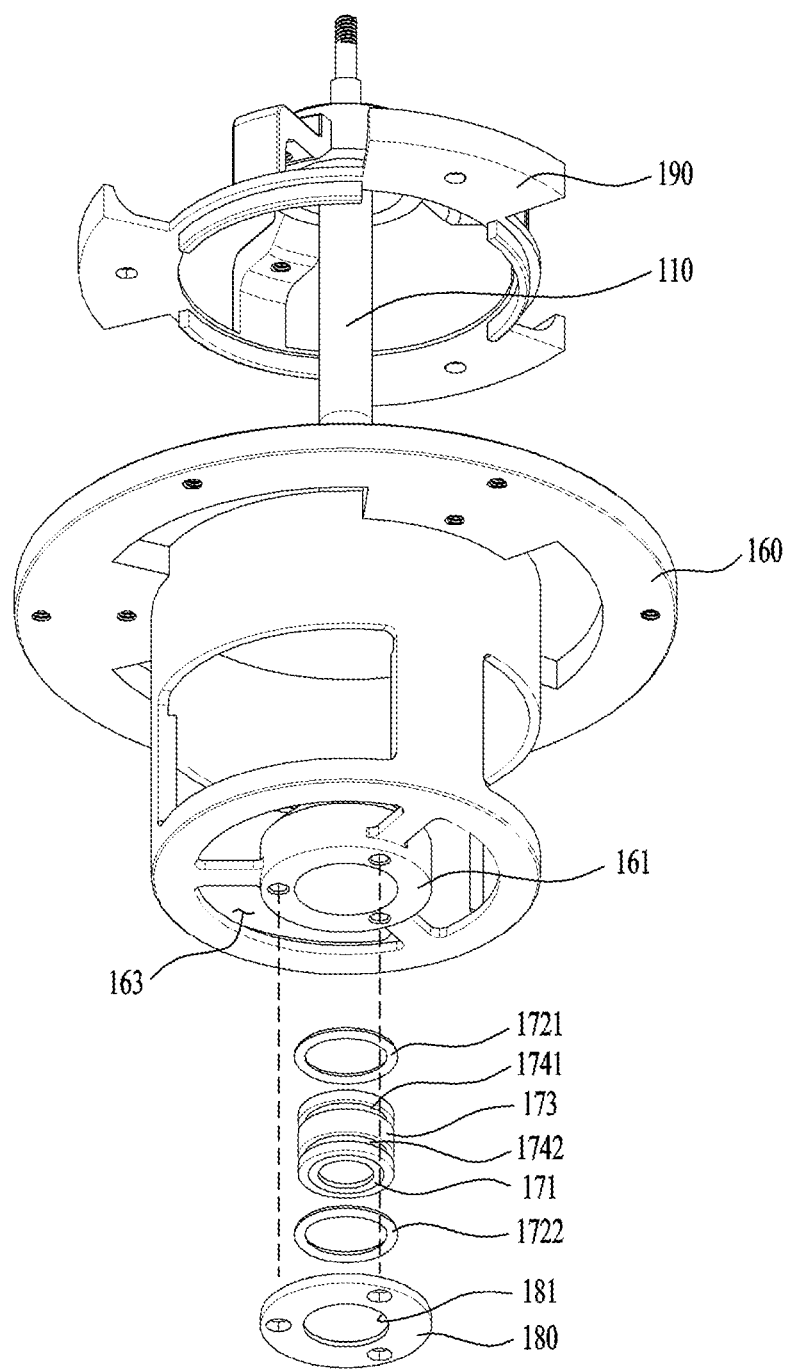
FIG. 3 is an exploded perspective view illustrating a portion of the motor assembly shown in FIG. 1.
Figure 4:
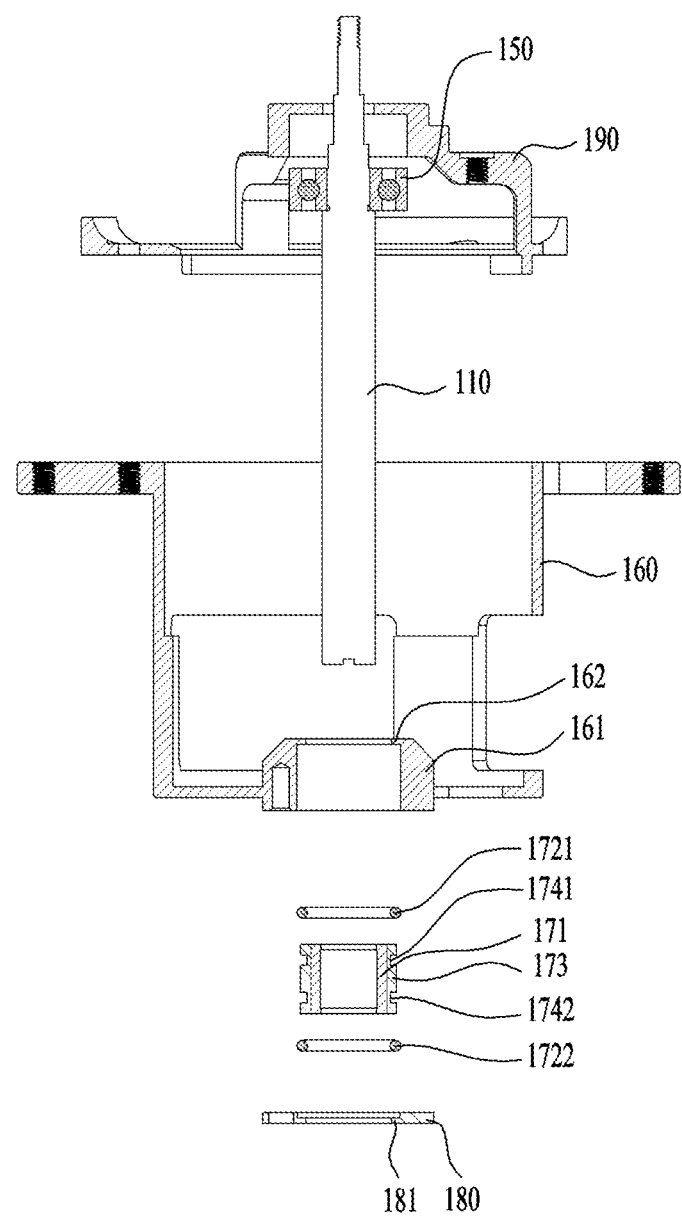
FIG. 4 is an exploded cross-sectional view illustrating a portion of the motor assembly shown in FIG. 3 as viewed from a side.

FIG. 1 is a cross-sectional view illustrating each component of a motor assembly according to an embodiment of the present disclosure. Further, FIG. 2 is an enlarged cross-sectional view enlarging a portion of the motor assembly shown in FIG. 1. Further, FIG. 3 is an exploded perspective view illustrating a portion of the motor assembly shown in FIG. 1. Further, FIG. 4 is an exploded cross-sectional view illustrating a portion of the motor assembly shown in FIG. 3 as viewed from a side.

Referring to FIGS. 1 and 2, a motor assembly 100 may include an inlet body 105, a rotation shaft 110, an impeller 120, a rotor 130, a stator 140, a rolling bearing 150, a motor housing 160, a gas bearing assembly 170, a fixed member 180, a rolling bearing bracket 190, and a diffuser 195. In this connection, the inlet body 105 and the motor housing 160 are configured to form an outer shape of the motor assembly 100, which may accommodate all other components in an empty space defined therebetween.

Specifically, an internal space of the motor assembly 100 may be divided into an impeller space S1 that is an empty space defined inside the inlet body 105 and a motor space S2 that is an empty space defined inside the motor housing 160. Gas flowing through the impeller space S1 and the motor space S2 may cool each component disposed inside the motor assembly 100, and accordingly, reduce heat generation of the motor assembly 100.

The inlet body 105 may include an inlet 1051 through which the gas is sucked, and may be disposed to surround an outer circumference of the impeller 120. That is, the impeller space S1 in which the impeller 120 is rotatably disposed may be defined inside the inlet body 105. Further, an outer surface of the inlet body 105 may correspond to a shape of the impeller 120, and an inner surface of the inlet body 105 may be curved so as to stably guide the gas flowing along the impeller space S1.

Specifically, a side opposite to the inlet 1051 of the inlet body 105 may be fastened to the motor housing 160 to form the outer shape of the motor assembly 100. The inlet body 105 and the motor housing 160 may be fastened to be in close contact with each other such that the gas flowing inside the motor assembly 100 does not leak to the outside through a space other than an outlet 163.

That is, it is preferable to fasten the inlet body 105 and the motor housing 160 with each other tightly such that no gap is defined between the inlet body 105 and the motor housing 160. Further, as a fastening scheme, various schemes, for example, screwing, fitting, and the like, may be used, but is not limited to one particular scheme.

In other words, the inlet body 105 and the motor housing 160 may be a kind of casing having a hollow therein, and the rotation shaft 110 may extend in the axial direction L in an empty space at a center of the motor housing 160 and the inlet body 105. As shown in the drawing, the rotation shaft 110 may not be directly supported by the inlet body 105 or the motor housing 160. That is, the inlet body 105 or the motor housing 160 may not include a separate rotation shaft supporter (tentative name) for supporting the rotation shaft 110.

The rotation shaft 110 may extend to cross the impeller space S1 and the motor space S2. In other words, the rotation shaft 110 may extend in a longitudinal direction, that is, the axial direction L of the motor assembly 100.

Hereinafter, a portion of the rotation shaft 110 accommodated inside the inlet body 105 will be defined as one side 110A of the rotation shaft 110, and another portion of the rotation shaft 110 accommodated inside the motor housing 160 will be defined as the other side 110.

In detail, the rotation shaft 110 may be accommodated inside the inlet body 105 and the motor housing 160. That is, a portion of the rotation shaft 110 may be accommodated in the inlet body 105 and another portion thereof may be accommodated in the motor housing 160 along the longitudinal direction. Further, the portion of the rotation shaft 110 accommodated in the inlet body 105 may be partially accommodated in the bearing bracket 190. In other words, the one side 110A of the rotation shaft 110 may be disposed at a side of the inlet body 105 and the rolling bearing bracket 190, and the other side 110B of the rotation shaft 110 may be disposed at a side of the motor housing 160.

One end 110C of rotation shaft 110 may be a free end not supported by the rolling bearing bracket 190 or the inlet body 105, and the other end 110D thereof may also be a free end that is not supported by the motor housing 160. In this connection, the "free end" may mean the both ends of the rotation shaft 110 that are not supported or constrained by any component.

The one end 110C of the rotation shaft 110 may be disposed to be close to the impeller 120 among the impeller 120 and the rotor 130, and may be the free end at a side of the impeller 120. Further, the other end 110D of the rotation shaft 110 may be close to the rotor 130 among the impeller 120 and the rotor 130, and may be the free end at a side of the rotor 130.

In one example, as will be described later, the rotation shaft 110 may be supported by a plurality of bearings between the one end 110C and the other end 110D thereof. In this connection, the plurality of bearings may mean a rolling bearing 150 and a gas bearing 171 to be described, and these will be described in detail below.

Specifically, the rotation shaft 110 may include an impeller coupling portion 111 on which the impeller 120 is installed, a first support 112 on which the rolling bearing 150 is installed, a rotor coupling portion 113 on which the rotor 130 is installed, and a second support 114 on which a gas bearing assembly 170 installed.

The impeller coupling portion 111 is a portion of the rotation shaft 110 on which the impeller 120 is installed, and is a portion adjacent to the one side 110A, particularly to the one end 110C of the rotation shaft 110. The impeller coupling portion 111 may be disposed in the impeller space S1, and disposed particularly to be adjacent to the inlet 1051 of the inlet body 105, through which the gas is flowed from the outside.

The first support 112 is a portion of the rotation shaft 110 on which the rolling bearing 150 to be described later is installed, and a portion corresponding to the one side 110A of the rotation shaft 110, which may be disposed in the impeller space S1. That is, the first support 112 is a portion of the rotation shaft 110 overlapping the rolling bearing 150 along a radial direction R of the rotation shaft 110, which may be supported in the radial direction R and the axial direction L by the rolling bearing 150.

The rotor coupling portion 113 is portion of the rotation shaft 110 on which the rotor 130 is installed, and a portion of the rotation shaft 110 positioned at a position adjacent to the other side 110B, and particularly to, the other end 110D of the rotation shaft 110, which may be disposed in the motor space S2. That is, the rotor coupling portion 113 may be a portion of the rotation shaft 110 overlapping the rotor 130 along the radial direction R of the rotation shaft 110.

The second support 114 is a portion of the rotation shaft 110 on which the gas bearing assembly 170 is installed, and is a portion corresponding to the other side 110B of the rotation shaft 110. In particular, the second support 114 is a portion closer to the other end 110D of the rotation shaft 110 than the rotor coupling portion 113, which may be disposed in the motor space S2. That is, the second support 114 is a portion of the rotation shaft 110 positioned at a side opposite to the first support 112 with respect to the rotor 130 along the axial direction L of the rotation shaft 110.

Further, the second bearing coupling portion 114 is another portion of the rotation shaft 110 overlapping the gas bearing assembly 170 along the radial direction R of the rotation shaft 110, which may be supported in the radial direction R by the gas bearing assembly 170.

Specifically, an outer diameter (see 114*d* in FIG. 2) of the second support 114 may be larger than an outer diameter (not shown) of the first support 112. This is because, since the gas bearing assembly 170 is installed on the second support 114, a component such as a step 115 on which the rolling bearing 150 is seated is not necessary like the first support 112. As such, a diameter of a portion of the rotation shaft 110 on which the gas bearing assembly 170 is installed, that is, the outer diameter 114*d* of the second support 114 may be the substantially the same as a diameter of another portion of the rotation shaft 110 on which the rotor 113 is installed, that is, an outer diameter 113*d* of the rotor coupling portion 113, so that a rigidity of the rotation shaft 110 may be further improved.

The rotation shaft 110 may rotate by an electromagnetic interaction between the rotor 130 and the stator 140. As the rotation shaft 110 rotates, the impeller 120 coupled to the rotation shaft 110 may also rotate together with the rotation shaft 110. Further, as the impeller 120 rotates, the gas may be sucked into the motor assembly 100.

The impeller 120 may be installed at the one side 110A of the rotation shaft 110. That is, the impeller 120 may be installed opposite to the other side 110B of the rotation shaft 110 at which the rotor 130 is installed with respect to the axial direction L of the rotation shaft 110. As described above, the impeller 120 may be fastened to the impeller coupling portion 111 of the rotation shaft 110 and rotate together with the rotation shaft 110 as the rotation shaft 110 rotates, and may be disposed in the impeller space S1 defined in the inlet body 105.

Specifically, the impeller 120 may include a hub 121 and a plurality of blades 122 protruding outward from an outer circumference of the hub 121. In one example, the impeller 120 may be made of a high strength synthetic resin material such as polyetheretherketone (PEEK) as a material thereof. However, the material of the impeller 120 may not be limited thereto, and may be made of metal as well as other high strength synthetic resin.

In addition, the impeller 120 may be a diagonal flow type impeller that sucks the gas such as air in the axial direction L of the rotation shaft 110 and discharges the gas in an oblique direction between a centrifugal direction and the axial direction. That is, the gas flowing into the inlet body 105 through the inlet 1051 may be guided toward the motor housing 160 along an outer surface of the hub 121 as the blades 122 rotate. However, embodiments of the present disclosure are not limited thereto, and the impeller 120 may be configured as a centrifugal impeller that sucks the gas in the axial direction and discharges the gas in the centrifugal direction. However, hereinafter, for convenience of description, the impeller 120 will be described based on a case of the diagonal flow type impeller.

The rotor 130 may be installed at the other side 110 of the rotation shaft 110. In other words, the rotor 130 may be installed on the rotor coupling portion 113 positioned at the other side 110 of the rotation shaft 110. That is, the rotor 130 may be coupled to the rotation shaft 110 to surround an outer circumferential face of the rotation shaft 110, and may be disposed in the motor space S2 in which the rotor coupling portion 113 is disposed.

Specifically, the rotor 130 may include a magnet 131 and a magnet core (not shown) on which the magnet 131 is mounted. In addition, the rotor 130 may further include a first end plate 132 and a second end plate 133 spaced apart from each other by a predetermined spacing about the magnet 131 along the axial direction L of the rotation shaft 110.

The first end plate 132 and the second end plate 133 may be installed on the rotation shaft 110 to surround the rotation shaft 110, and may respectively support both ends of the magnet 131 and the magnet core with respect to the axial direction L of the rotation shaft 110 to firmly fix the magnet 131 and the magnet core to the rotation shaft 110 such that the magnet 131 and the magnet core do not move along the axial direction L.

The stator 140 may be installed on an inner circumferential face of the motor housing 160 to surround an outer face of the rotor 130 such that the stator 140 is spaced apart from the rotor 130 by a predetermined spacing along the radial direction R of the rotation shaft 110. That is, the stator 140 may be disposed in the motor space S2 in which the rotor coupling portion 113 of the rotation shaft 110 is located, like the rotor 130.

Specifically, the stator 140 may include a stator core 141 made of a conductor, a coil 142 wound around the stator core 141, and an insulator 143 that electrically insulates the stator core 141 from the coil 142. A current may be applied to the coil 142, and as the current is applied to the coil 142, the rotor 130 may rotate relative to the stator 140.

The rolling bearing 150 may be installed at the one side 110A of the rotation shaft 110 to support the rotation of the rotation shaft 110, and may be disposed between the impeller 120 and the rotor 130 to support the first support 112 of the rotation shaft 110. As will be described in more detail later, the rolling bearing 150 may support the one side 110A of the rotation shaft 110 in the radial direction R and in the axial direction L of the rotation shaft 110 by a coupling relationship with the rolling bearing bracket 190. As described above, the rolling bearing 150 may be installed on an outer circumferential face of the first support 112 positioned at the one side 110A of the rotation shaft 110.

Specifically, the rolling bearing 150 may include an inner ring 151 installed on an outer circumferential face of the first support 112, an outer ring 152 fixed to the rolling bearing bracket 190, and a rolling member 153 interposed between the inner ring 151 and the outer ring 152 to support a relative rotational movement of the inner ring 151 relative to the outer ring 152.

An outer diameter 112*d* of the first support 112 along the radial direction R of the rotation shaft 110 is smaller than an outer diameter 113*d* of the rotor coupling portion 113. Further, a contact face 1131 on which the rolling bearing 150 and the rotor coupling portion 113 are in contact with each other may extend along the radial direction R of the rotation shaft 110.

Specifically, the inner ring 151 of the rolling bearing 150 may be fixed to the outer circumferential face of the first support 112 and the contact face 1131. Accordingly, when the rotation shaft 110 rotates, the inner ring 151 of the rolling bearing 150 may also rotate with the rotation shaft 110.

In one example, the outer ring 152 of the rolling bearing 150 may be fixed by the rolling bearing bracket 190. Accordingly, a portion of the rotation shaft 110, that is, the first support 112 may be supported in the radial direction R and the axial direction L by the rolling bearing 150.

As will be described later, the rolling bearing bracket 190 may remain fixed inside the inlet body 105 regardless of the rotation of the rotation shaft 110, so that the outer ring 152 may also remain fixed with the rolling bearing bracket 190 even when the rotation shaft 110 rotates.

When expressing such structure differently, the rotation shaft 110 may further include the step 115 on which the rolling bearing 150 is seated. A length of the step 115 may correspond to a difference between the outer diameter 112*d* of the first support 112 and the outer diameter 113*d* of the rotor coupling portion 113. The step 115 may prevent a movement of the rolling bearing 150 in a direction toward the rotor 130 with respect to the axial direction L of the rotation shaft 110, that is, in a direction toward the other side 110B from the one side 110A of the rotation shaft 110.

As such, the rolling bearing 150 may be accommodated in the rolling bearing bracket 190. Further, the rolling bearing bracket 190 will be described in more detail below.

The motor housing 160 may be formed to surround an outer circumference of the stator 140, so that the stator 140 may be installed on the inner circumferential face of the motor housing 160. Further, the motor housing 160 may be fastened with the inlet body 105 to form the outer shape of the motor assembly 100. In detail, the motor space S2 in which the other side 110B of the rotation shaft 110, the rotor 130, the stator 140, and the gas bearing assembly 170 may be accommodated may be defined inside the motor housing 160.

In one example, the motor housing 160 may include a gas bearing bracket 161 for accommodating the second support 114 of the rotation shaft 110 and the gas bearing assembly 170 therein.

In detail, the gas bearing bracket 161 may include a through hole (not shown) through which the rotation shaft 110 penetrates defined at a center thereof, and a first step 162 overlapping with the gas bearing assembly 170 with respect to the axial direction L of the rotation shaft 110 such that the gas bearing assembly 170 is prevented from being detached from the gas bearing bracket 161 along a direction from the rotor 130 toward the impeller 120 based on the axial direction L of the rotation shaft 110, that is, a first direction.

In addition, the gas bearing bracket 161 may be installed at a position adjacent to the other side 110B, and particularly to, the other end 110D of the rotation shaft 110, like the gas bearing assembly 170. That is, the gas bearing bracket 161 may surround another portion of the rotation shaft 110, that is, the outer circumferential face of the second support 114.

In addition, the motor housing 160 may include an outlet 163 through which the gas guided from the impeller space S1 to the motor space S2 by the rotation of the impeller 120 is discharged to the outside of the motor housing 160, and the outlet 163 may be defined at the opposite side of the inlet 1051 with respect to a flow direction of the gas.

The gas bearing assembly 170 may be accommodated in the gas bearing bracket 161 to support rotation of the second support 114 of the rotation shaft 110. Specifically, the gas bearing assembly 170 may include a gas bearing 171 surrounding an outer circumferential face of the second support 114, wherein the gas bearing 171 is spaced apart from the second support 114 of the rotation shaft 110 by a predetermined spacing when the rotation shaft 110 rotates, and an elastic member 172 interposed between an inner circumferential face of the gas bearing bracket 161 and an outer circumferential face of the gas bearing 171 to elastically support the gas bearing 171.

As such, unlike the rolling bearing 150 formed by coupling a plurality of components, such as the inner ring 151, the outer ring 152, and the rolling member 153, with each other, the gas bearing assembly 170 may sufficiently support the rotation shaft 110 even with the gas bearing 171 having substantially the same thickness as the single inner ring 151 of the rolling bearing 150, so that the gas bearing assembly 170 may have a volume smaller than that of the rolling bearing 150. The gas bearing 171 may be made of a material containing at least one of aluminum, brass, bronze, and a nickel-chromium alloy. In a case of the nickel-chromium alloy, it is preferable that a content of nickel is larger than that of chromium.

In addition, the gas bearing 171 may be a contactless bearing, and as the rotational speed of the rotation shaft 110 increases, a load bearing capability of the contactless bearing increases, so that the contact bearing may stably support the rotation shaft 110.

Specifically, when the rotation shaft 110 rotates at the high speed, a predetermined gap through which gas with a high pressure may flow may be defined between the outer circumferential face of the rotation shaft 110, that is, the outer circumferential face of the second support 114 and an inner circumferential face of the gas bearing 171. The rotation shaft 110 may be supported in the radial direction R by gas with the high pressure flowing through the gap defined between the outer circumferential face of the second support 114 and the inner circumferential face of the gas bearing 171.

In this connection, the gap defined between the outer circumferential face of the second support 114 and the inner circumferential face of the gas bearing 171 may be relatively fine compared to the empty space defined between the second support 114 and the gas bearing bracket 161. In addition, the gas bearing 171 may an oil-less bearing that may be lubricated by the gas flowing through the gap, and may support the rotation shaft 110 while not being in contact with the rotation shaft 110.

When no current is applied to the coil 142, that is, when the rotation shaft 110 is stopped before rotating, the gap may not be uniformly defined along the circumferential direction of the second support 114. That is, when the rotation shaft 110 does not rotate, the rotation shaft 110 may be partially inclined along the axial direction L with respect to a central axis (not shown).

In such state, when the rotation shaft 110 rotates, the gap is defined between the outer circumferential face of the second support 114 and the inner circumferential face of the gas bearing 171. As the rotation speed of the rotation shaft 110 increases, the gap may be uniformly defined along the circumferential direction of the second support 114. Based on such structure, when the high speed rotation of the rotation shaft 110 is started, an environment in which fluid with a high pressure may flow may be defined between the second support 114 and the gas bearing 171.

In this connection, when it is described that the rotation shaft 110 rotates at the high speed, the "high speed" means a case in which the rotation shaft 110 rotates at tens of thousands of RPM (revolutions per minute), and may preferably mean a case in which rotation shaft 110 rotates at 100,000 RPM or higher.

When the rotation shaft 110 rotates at the high speed, the gas flowing through the gap defined between the outer circumferential face of the second support 114 and the inner circumferential face of the gas bearing 171 may serve as a kind of bearing. That is, the gas flowing through the gap may function as a journal bearing for supporting the rotation shaft 110 in the radial direction R.

In one example, as described above, the rolling bearing 150 may support the first support 112 located at the one side 110A of the rotation shaft 110, and the gas bearing 171 may support the second support 114 located at the other side 110B of the rotation shaft 110, so that the rotation shaft 110 may rotate at the high speed while the both sides thereof are respectively supported by the two bearings.

In such a structure in which the both sides of the rotation shaft 110 are respectively supported by the two bearings, an alignment between the two bearings should be very good. When an imaginary line 150C passing through a center of an inner circumferential face of the rolling bearing 150 and a line 171C passing through a center of an inner circumferential face of the gas bearing 171 are not in the same line with each other, that is, when an alignment between the rolling bearing 150 and the gas bearing 171 is poor, lives of the rolling bearing 150 and the gas bearing 171 may be significantly shortened.

In order to solve such problem, in an embodiment of the present disclosure, a predetermined space is defined between the gas bearing assembly 170 and the gas bearing bracket 161 for accommodating the gas bearing assembly 170 therein, and the elastic member 172 is installed inside the space, so that when the rotation shaft 110 rotates at the high speed, the gas bearing assembly 170 may be automatically guided to a position suitable for stably supporting the rotation shaft 110.

This is to use the characteristic that the gap defined between the second support 114 and the gas bearing 171 is intended to be uniformly defined along the outer circumferential face of the second support 114 when the rotation shaft 110 rotates at the high speed.

For example, even when the alignment between the rolling bearing 150 and the gas bearing 171 are poor before the rotation shaft 110 rotates, as the rotation shaft 110 starts to rotate, the gap begins to be defined between the rotation shaft 110 and the gas bearing 171. When the gap is to be defined uniformly along the outer circumferential face of the second support 114 based on the above-mentioned characteristic, the gas bearing 171 itself may move a predetermined distance, and may remain fixed at a specific position inside the gas bearing bracket 161, which is a moved position, by the elastic member 172.

Based on such structure, the predetermined space is defined between the gas bearing bracket 161 and the gas bearing assembly 170, and the elastic member 172 is disposed in the space, so that when the rotation shaft 110 rotates, the rolling bearing 150 and the gas bearing 171 are automatically aligned with each other to prevent the shortening of the lives of the bearings due to the misalignment.

In addition, the gas bearing assembly 170 may further include a bush 173 for surrounding the outer circumferential face of the gas bearing 171, wherein the outer circumferential face of the gas bearing 171 is press-fitted and fixed on an inner circumferential face of the bush 173, and a fixing groove 174 in which the elastic member 172 is seated is defined in an outer circumferential face of the bush 173.

Specifically, the bush 173 is made of a synthetic resin material, and preferably molded of a high strength synthetic resin material such as polyetheretherketone (PEEK) and the like to press-fit and fix, to the inner circumferential face thereof, the gas bearing 171 containing at least one of the aluminum, the brass, the bronze, and the nickel-chromium alloy as the material as mentioned above.

In addition, at least a portion of the bush 173 overlaps with the first step 162 with respect to the axial direction L of the rotation shaft 110, so that the gas bearing assembly 170 may be prevented from being detached in the direction from an interior of the gas bearing bracket 161 toward the impeller 120, that is, in the first direction. That is, referring to FIG. 2, an inner diameter 162d of the first step 162 may be smaller than an outer diameter 173e of the bush 173 (162d<173e), and may be larger than the inner diameter 173d of the bush 173 (162d>173d).

In one example, the fixing groove 174 may include a first sub-fixing groove 1741 and a second sub-fixing groove 1742 defined to be spaced apart from each other by a predetermined spacing along the axial direction L of the rotation shaft 110. Further, the elastic member 172 includes a first sub-elastic member 1721 that is seated in the first sub-fixing groove 1741, and a second sub-elastic member 1722 that is seated in the second sub-fixing groove 1742.

As such, when the two elastic members 1721 and 1722 are interposed between the gas bearing bracket 161 and the gas bearing assembly 170 along the axial direction L of the rotation shaft 110, in the gas bearing bracket 161, the gas bearing assembly 170 may move a predetermined distance only along the axial direction L of the rotation shaft 110 without being eccentric or biased to one side, so that the gas bearing assembly 170 may be more stably aligned.

As such, a portion of the rotation shaft 110 at aside opposite to the impeller 120 relative to the rotor 130, specifically the second support 114, is supported by the gas bearing 171 having a theoretically infinite life and at the same time having a volume smaller than that of the general rolling bearing 150, so that the lives of the bearings are sufficiently secured, and at the same time, a trend of miniaturization and weight lightening of the motor assembly 100 may be reflected.

In addition, the both sides of the rotation shaft 110 are respectively supported by the rolling bearing 150 and the gas bearing assembly 170 along the axial direction L of the rotation shaft 110, so that the rotation shaft 110 that rotates at the high speed may be stably supported, thereby ensuring reliability and durability of the bearing structure.

In one example, the motor assembly 100 may further include the fixed member 180 that is coupled with the gas bearing bracket 161 to provide a predetermined space in which the gas bearing assembly 170 may move in a direction opposite to the first direction towards the impeller 120, that is, in a second direction towards the rotor 130 from the impeller 120, wherein the fixed member 180 includes a second step 181 overlapping the gas bearing assembly 170 with respect to the axial direction L of the rotation shaft 110 to prevent the gas bearing assembly 170 from being detached from the gas bearing bracket 161 along the second direction.

An inner diameter 180d of the fixed member 180 may substantially correspond to an inner diameter 161d of the gas bearing bracket 161. Accordingly, the gas bearing assembly 170 may move a predetermined distance along the axial direction of the rotation shaft 110 along inner circumferential faces of the gas bearing bracket 161 and the fixed member 180. In addition, the fixed member 180 may be fastened and fixed to the gas bearing bracket 161 through a fastening member (not shown) such as a bolt and a nut.

Hereinafter, for convenience of description, the "first direction" will be defined as a direction from the other side 110B of the rotation shaft 110 toward the one side 110A, and the "second direction" will be defined as a direction opposite to the first direction, that is, a direction from the one side 110A of the rotation shaft 110 toward the other side 110B.

Specifically, referring to FIG. 2, an inner diameter 181d of the second step 181 is smaller than the outer diameter 173e of the bush 173 (181d<173e), and the inner diameter 181d of the second step 181 may be larger than the inner diameter 173d of the bush 173 (181d>173d).

Based on such structure, the bush 173 may move a predetermined distance along the axial direction L of the rotation shaft 110 in the gas bearing bracket 161, but may be prevented from being detached from the gas bearing bracket 161 by the first step 162 along the first direction, and may be prevented from being detached from the gas bearing bracket 161 by the second step 181 along the second direction.

The rolling bearing bracket 190 may be coupled to the motor housing 160 in a state in which the rolling bearing bracket 150 is accommodated therein. Specifically, the rolling bearing bracket 190 may include a side support 191 having a through hole (not shown) through which the rotation shaft 110 penetrates defined at the center thereof, and having at least a portion thereof overlapping the rolling bearing 150 with respect to the radial direction R of the rotation shaft 110 to prevent the movement of the rolling bearing 150 in the radial direction R of the rotation shaft 110, and a longitudinal support 192 having at least a portion thereof overlapping with the rolling bearing 150 with respect to the axial direction L of the rotation shaft 110 to prevent the movement of the rolling bearing 150 in the first direction towards the impeller 120 with respect to the axial direction L of the rotation shaft 110.

In addition, the rolling bearing bracket 190 may be installed between the impeller 120 and the rotor 130 like the rolling bearing 150. That is, the rolling bearing bracket 190 may surround a portion of the rotation shaft 110, that is, the outer circumferential face of the first support 112.

In one example, the rolling bearing bracket 190 may be formed integrally with a diffuser 195 to be described later. Preferably, the rolling bearing bracket 190 may be fastened with the diffuser 195 after being manufactured separately from the diffuser 195. When the rolling bearing bracket 190 and the diffuser 195 are integrally formed, an assembly tolerance may be reduced relatively, thereby smoothly flowing the gas flowing into the inlet body 105.

The diffuser 195 may be installed between the impeller 120 and the rolling bearing bracket 190 to guide the gas flowed into the inlet body 105 to the motor housing 160. That is, a predetermined space through which the gas may flow may be defined between the diffuser 195 and the inlet body 105. The diffuser 195 may be fastened and fixed to the rolling bearing bracket 190 through a fastening member (not shown) such as a bolt and a nut.

A plurality of diffuser vanes 1951 protruding toward an inner surface of the inlet body 105 may be formed on an outer surface of the diffuser 195. The plurality of diffuser vanes 1951 may convert a dynamic pressure of the gas passing through the impeller 120 into a static pressure.

The plurality of diffuser vanes 1951 may be arranged on the outer surface of the diffuser 195 to be spaced from each other at a substantially the same spacing along a circumferential direction, but embodiments are not limited thereto. For example, spacings between two adjacent diffuser vanes 1951 may gradually increase and then decrease, or may decrease and then increase. Further, the spacings between two adjacent diffuser vanes 1951 may be different from each other. In addition, the diffuser 195 may further include a through hole (not shown) defined therein through which the rotation shaft 110 and the rolling bearing bracket 190 pass.

Based on such structure, the gas flowed into the inlet body 105 through the inlet 1051 may be guided into a space between the inlet body 105 and the diffuser 195 by the impeller 120, and the gas flowed to the space between the inlet body 105 and the diffuser 195 may be guided from the impeller space S1 to the motor space S2 by the plurality of diffuser vanes 1951.

Hereinafter, a method for manufacturing the motor assembly 100 shown in FIGS. 1 to 4 will be described in detail with reference to FIG. 5.

Figure 5:
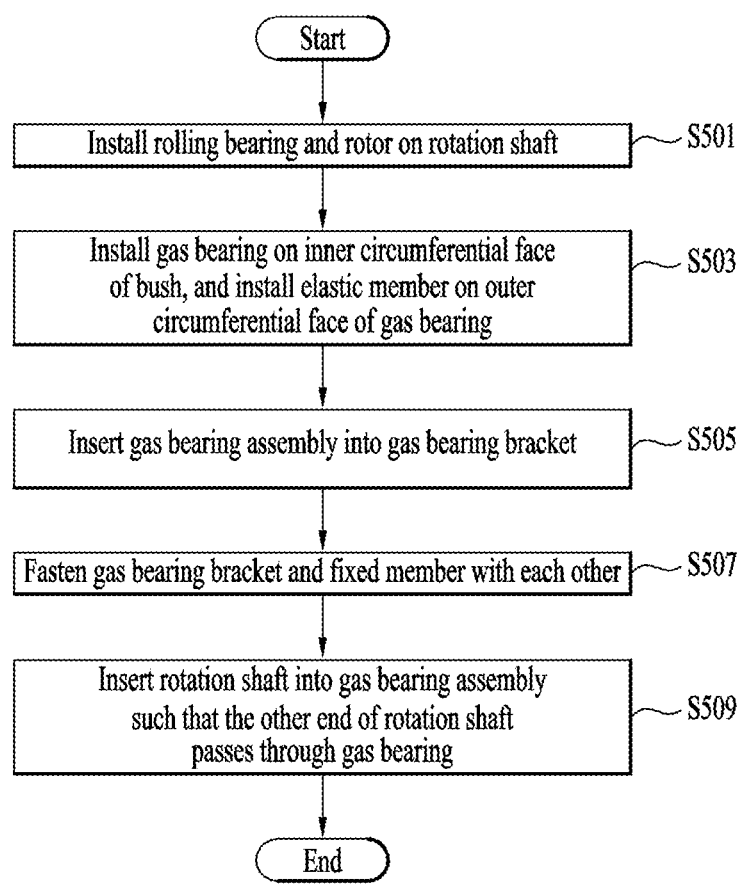
FIG. 5 is a flowchart schematically illustrating a method for manufacturing the motor assembly shown in FIG. 1.

FIG. 5 is a flowchart schematically illustrating a method for manufacturing the motor assembly shown in FIG. 1.

Referring to FIG. 5, a method for manufacturing the motor assembly 100 may include installing the rolling bearing 150 and the rotor 130 on the rotation shaft 110 (S501), installing the gas bearing 171 on the inner circumferential face of the bush 173, and installing the elastic member 172 on the outer circumferential face of the gas bearing 171 (S503), inserting the gas bearing assembly 170 into the gas bearing bracket 161 (S505), fastening the gas bearing bracket 161 and the fixed member 180 with each other (S507), and inserting the rotation shaft 110 into the gas bearing assembly 170 such that the other end 110D of the rotation shaft 110 passes through the gas bearing 171 (S509).

Specifically, the installing of the rolling bearing 150 and the rotor 130 on the rotation shaft 110 (S501) may be performed by installing the rolling bearing 150 at the one side 110A of the rotation shaft 110 and installing the rotor 130 at the other side 110 of the rotation shaft 110.

In this connection, the rolling bearing 150 may be installed on a portion of the rotation shaft 110 to surround the outer circumferential face of the first support 112 of the rotation shaft 110, and the rotor 130 may be installed on another portion of the rotation shaft 110 to surround the outer circumferential face of the rotor coupling portion 113 of the rotation shaft 110.

In one example, the installing of the gas bearing 171 on the inner circumferential face of the bush 173, and the installing of the elastic member 172 on the outer circumferential face of the gas bearing 171 (S503) may be performed by inserting the gas bearing 171 into a through hole defined at a center of the bush 173 and press-fitting and fixing the gas bearing 171 on the inner circumferential face of the bush 173, and by seating the first sub-elastic member 1721 and the second sub-elastic member 1722 respectively in the first sub-fixing groove 1741 and the second sub-fixing groove 1742 defined in the outer circumferential face of the bush 173.

As such, the gas bearing 171 is installed on the inner circumferential face of the bush 173 and the elastic member 172 is installed on the outer circumferential face of the bush 173, so that the gas bearing 171, the elastic member 172, and the bush 173 may be fastened to each other to be assembled into the gas bearing assembly 170 that functions as a contactless gas bearing for supporting the second support 114 of the rotation shaft 110 in the radial direction R of the rotation shaft 110.

Next, the inserting of the gas bearing assembly 170 into the gas bearing bracket 161 (S505) may be performed by inserting the gas bearing assembly 170 into the gas bearing bracket 161 in a direction toward the rotor 130 from an opposite side to the rotor 130 with respect to the gas bearing bracket 161, that is, in the first direction.

Further, the fastening of the gas bearing bracket 161 and the fixed member 180 with each other (S507) may be performed by fastening the fixed member 180 to the gas bearing bracket 161 by approaching the fixed member 180 to the gas bearing bracket 161 also in the direction toward the rotor 130 from the opposite side to the rotor 130 with respect to the gas bearing bracket 161, that is in the first direction.

Further, the inserting of the rotation shaft 110 into the gas bearing assembly 170 such that the other end 110D of the rotation shaft 110 passes through the gas bearing 171 (S509) may be performed in a scheme for installing the rotation shaft 110 in the gas bearing assembly 170 by approaching the rotation shaft 110 toward the gas bearing assembly 170 such that the other end 110D of the rotation shaft 110 on which the rolling bearing 150 and the rotor 130 are installed passes through the gas bearing 171 along the second direction in a state in which the gas bearing assembly 170 is seated in the gas bearing bracket 161 and the fixed member 180 is installed on the gas bearing bracket 161 as described above.

In this connection, the inserting of the rotation shaft 110 into the gas bearing assembly 170 does not mean coupling the rotation shaft 110 and the gas bearing assembly 170 with each other, but means positioning a portion of the rotation shaft 110, that is, the second support 114 of the rotation shaft 110 in the space defined inside the gas bearing 171.

In other words, when the rotation shaft 110 is inserted into the gas bearing assembly 170, the gas bearing 171 may surround the circumference of the second support 114 of the rotation shaft 110, but the predetermined gap may be defined such that, but, when the rotation shaft 110 rotates, the gas with the high pressure may flow between the outer circumferential face of the second support 114 and the inner circumferential face of the gas bearing 171 to serve as the bearing.

In one example, although not separately shown in the drawing, before the installing of the rotation shaft 110 into the gas bearing assembly 170 (S509), seating the rolling bearing 150 installed on the rotation shaft 110 in the rolling bearing bracket 190, installing the diffuser 195 on the rolling bearing bracket 190, and installing the stator 140 on the inner circumferential face of the motor housing 160 may be further performed.

Specifically, before the installing of the rotation shaft 110 in the gas bearing assembly 170 (S509), that is, before the other end 110D of the rotation shaft 110 passes through the gas bearing 171, the stator 140 may be installed on the inner circumferential face of the motor housing 160. This means that the bearing is not installed at the other side 110B of the rotation shaft 110 when the rotation shaft 110 passes through the stator 140.

This means that the size of the bearing does not need to be smaller than the inner diameter of the stator 140 in designing the bearing structure that supports the other side 110B of the rotation shaft 110, especially in determining the size of the bearing. Accordingly, the outer diameter of the gas bearing assembly 170 supporting the other side 110B of the rotation shaft 110, that is, the second support 114, may be larger than the inner diameter of the stator 140. In one example, in determining the outer diameter of the gas bearing assembly 170, it is not necessary to consider the inner diameter of the stator 140, so that the outer diameter of the gas bearing assembly 170 may be smaller than the inner diameter of the stator 140.

The outer diameter of the gas bearing assembly 170 may be selected to have the outer diameter larger than the inner diameter of the stator 140 so as to stably bear a rotational load of the rotation shaft 110 and at the same time ensure sufficient life, and simultaneously, selected to have the outer diameter smaller than the inner diameter of the stator 140 when it is necessary in consideration of the trend of the weight lightening and the miniaturization of the motor assembly 100. Thus, the size of the bearing may be freely selected based on a required performance of the motor assembly 100.

In addition, although not separately shown in the drawing, after the installing of the rotation shaft 110 into the gas bearing assembly 170 (S509), fastening the inlet body 105 for accommodating the one side 110A of the rotation shaft 110, the impeller 120, the rolling bearing 150, the rolling bearing bracket 190, and the diffuser 195 therein with the motor housing 160 accommodating the other side 110B of the rotation shaft 110, the rotor 130, the stator 140, and the gas bearing assembly 170 therein to complete the manufacture of the motor assembly 100 may be further performed.

Hereinafter, a variant of the motor assembly 100 illustrated in FIG. 1 will be described in detail with reference to FIGS. 6 to 9.

Figure 6:
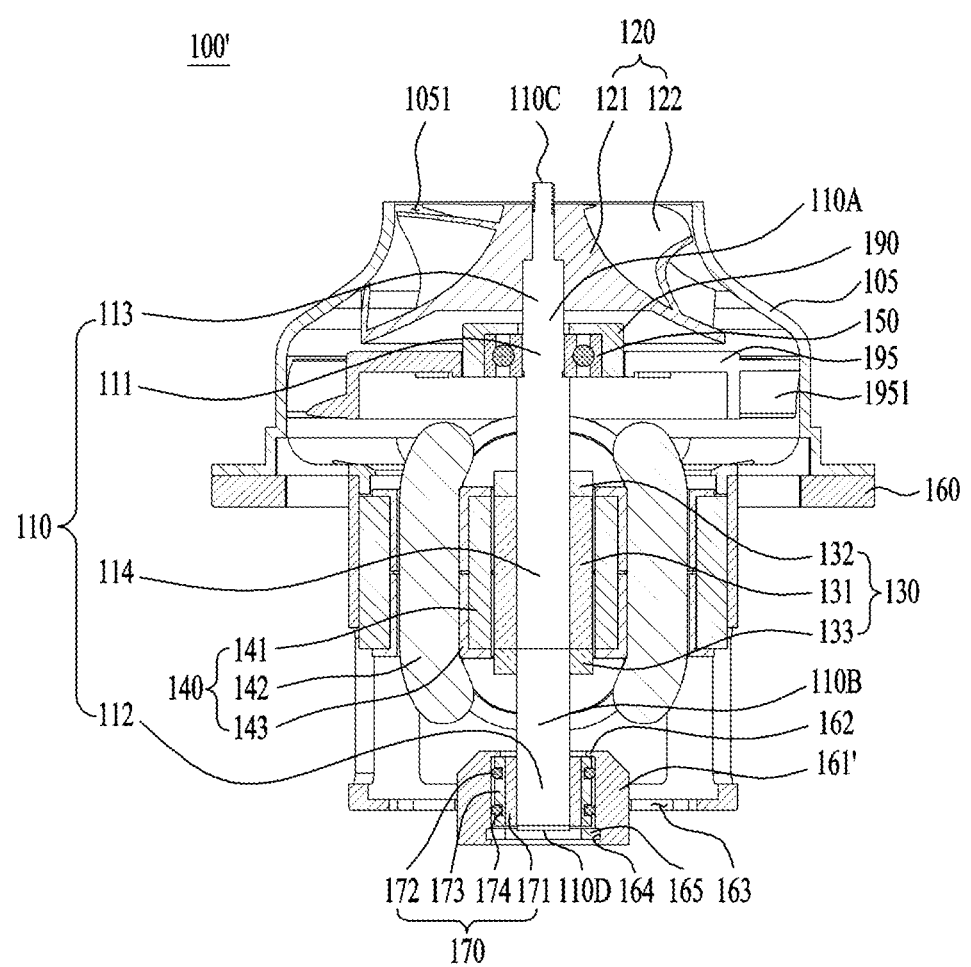
FIG. 6 is a cross-sectional view illustrating a variant of the motor assembly shown in FIG. 1.
Figure 7:
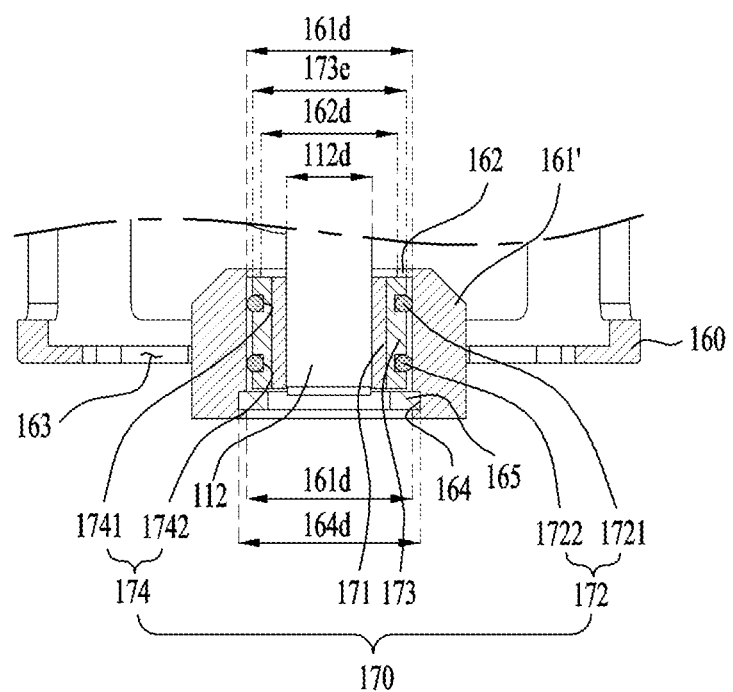
FIG. 7 is an enlarged cross-sectional view enlarging a portion of the motor assembly shown in FIG. 6.
Figure 8A:
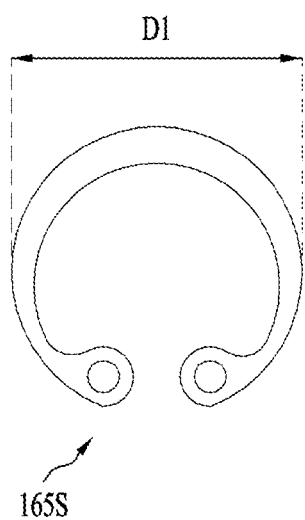
FIGS. 8A and 8B are conceptual diagrams illustrating a comparison between a normal state and a compressed state of a snap ring illustrated in FIG. 7.
Figure 8B:
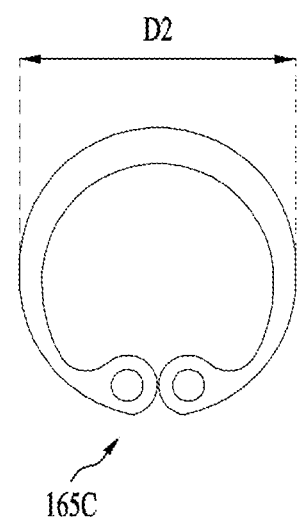
Figure 9:
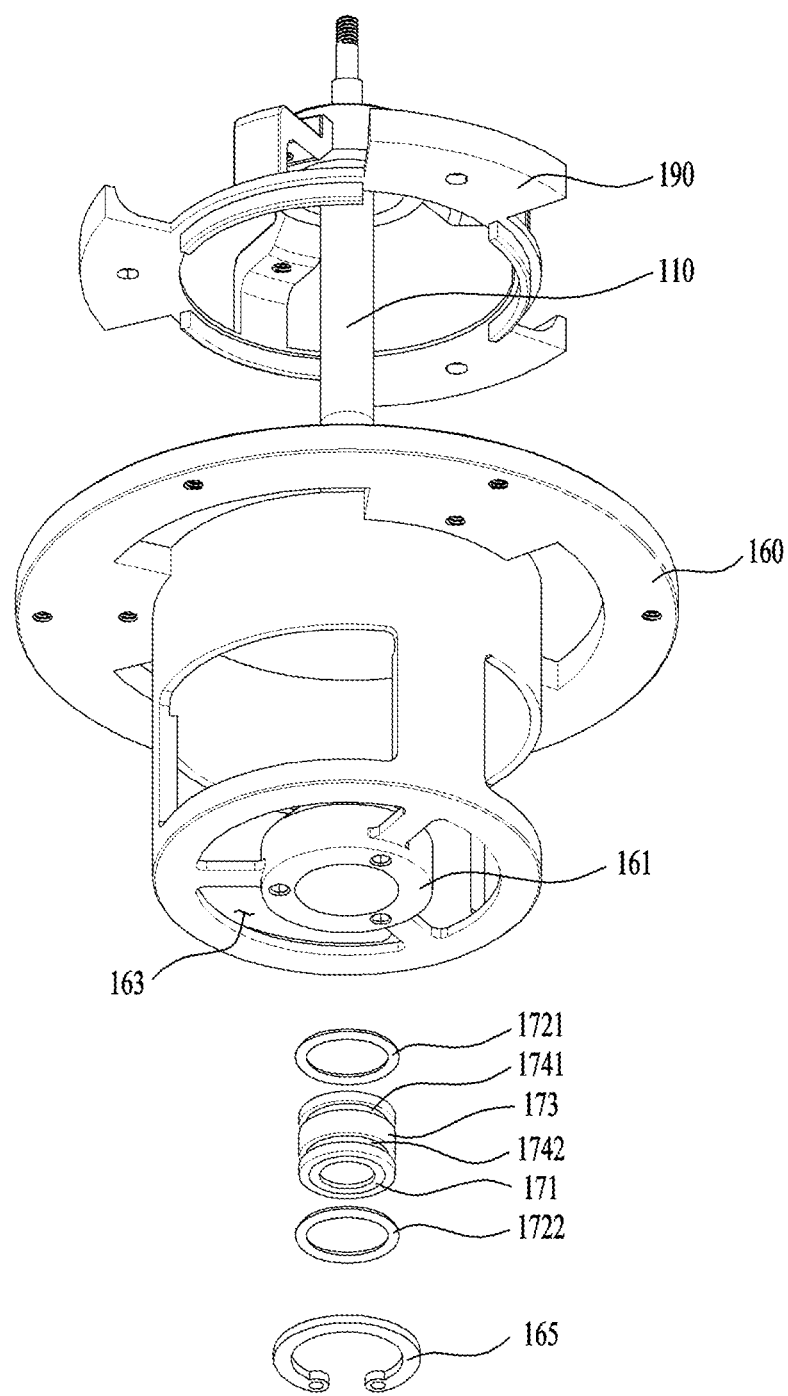
FIG. 9 is an exploded perspective view illustrating a portion of the motor assembly shown in FIG. 6.
Figure 10:
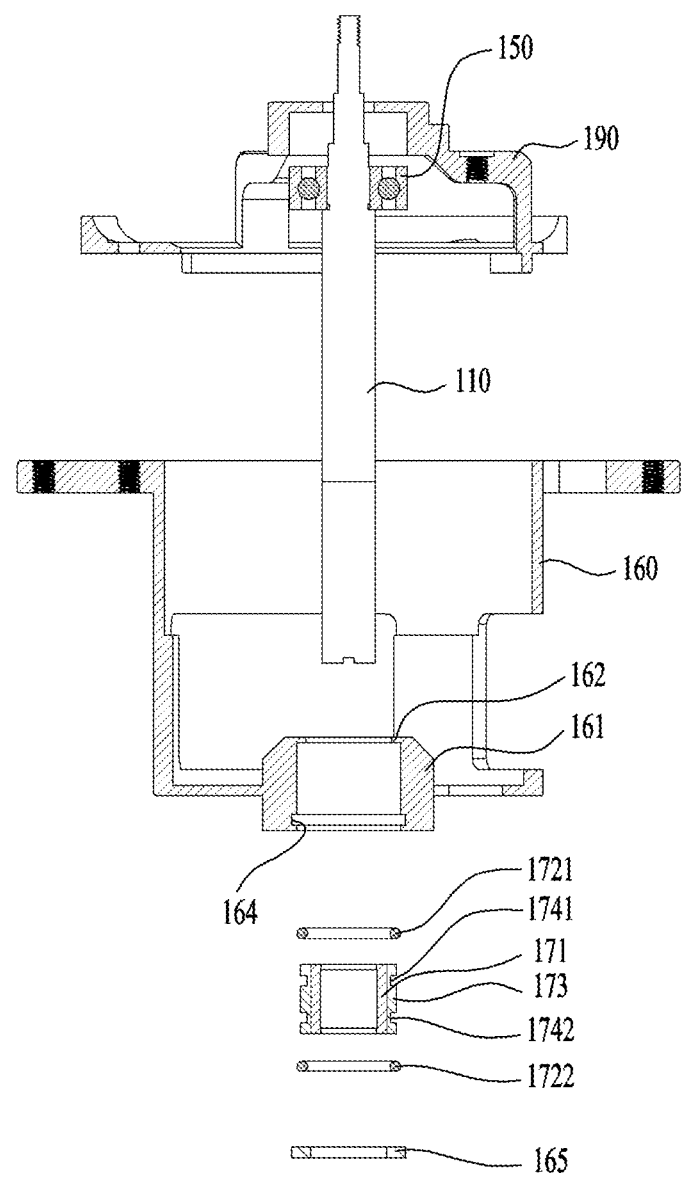
FIG. 10 is an exploded cross-sectional view illustrating a portion of the motor assembly shown in FIG. 6 viewed from a side.
Figure 11:
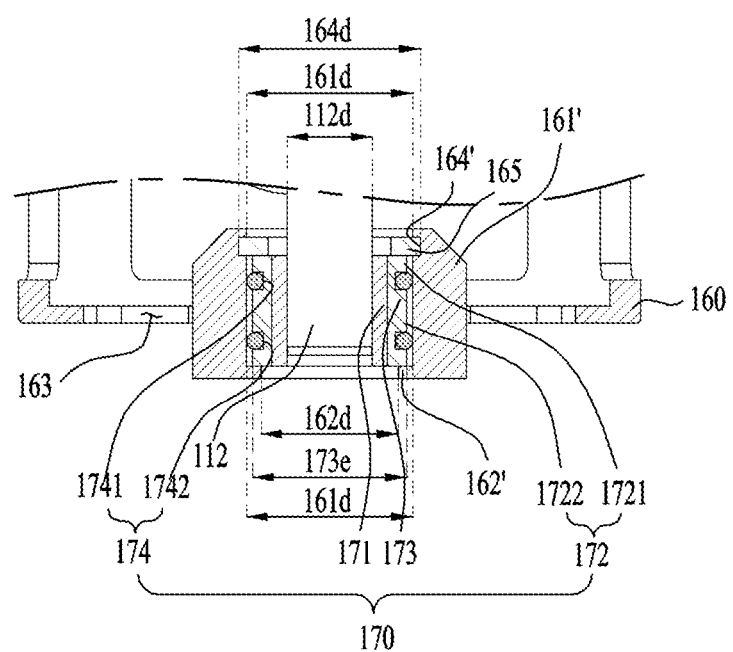
FIG. 11 is an enlarged cross-sectional view illustrating a variant of a gas bearing bracket and the snap ring shown in FIG. 7.

FIG. 6 is a cross-sectional view illustrating a variant of the motor assembly shown in FIG. 1. Further, FIG. 7 is an enlarged cross-sectional view enlarging a portion of the motor assembly shown in FIG. 6. Further, FIGS. 8A and 8B are conceptual diagrams illustrating a comparison between a normal state and a compressed state of a snap ring illustrated in FIG. 7. Further, FIG. 9 is an exploded perspective view illustrating a portion of the motor assembly shown in FIG. 6. Further, FIG. 10 is an exploded cross-sectional view illustrating a portion of the motor assembly shown in FIG. 6 viewed from a side. Further, FIG. 11 is an enlarged cross-sectional view illustrating a variant of a gas bearing bracket and the snap ring shown in FIG. 7.

Among components of a motor assembly 100' to be described with reference to FIGS. 6 to 9 below, structures of the remaining components, for example, the inlet body 105, the rotation shaft 110, the impeller 120, the rotor 130, the stator 140, the rolling bearing 150, the gas bearing assembly 170, the fixed member 180, the rolling bearing bracket 190, and the diffuser 195, except for an installation groove 164 and a snap ring 165 of a gas bearing bracket 161' to be described later are substantially the same as the structures of the components illustrated in FIG. 1, so that a detailed description thereof will be omitted.

Referring to FIGS. 6 to 9, the gas bearing bracket 161' may include the installation groove 164 recessed by a predetermined width along the radial direction of the rotation shaft 110 from an inner circumferential face of the gas bearing bracket 161', and the snap ring 165 installed in the installation groove 164.

Specifically, referring to FIGS. 8A and 8B, the snap ring 165 may be elastically deformable between a compressed state 165C compressed by an externally applied force and a normal state 165S expanded from the compressed state 165C as the externally applied force is removed (D2<D1).

In particular, in the compressed state 165C, the snap ring 165 may have a diameter substantially corresponding to or smaller than a diameter 161d of the inner circumferential face of the gas bearing bracket 161' (D2≤161d).

That is, the snap ring 165 may be inserted into the gas bearing bracket 161' in the compressed state 165C. After being seated in the installation groove 164, the snap ring 165 may expand again to return to the normal state 165S.

The snap ring 165 may perform the function of the second step 181 of the fixed member 180 illustrated in FIG. 1. That is, the snap ring 165 provides a predetermined clearance space in which the gas bearing assembly 170 may move along the axial direction L of the rotation shaft 110, and in the normal state 165S, at least a portion of the snap ring 165 overlaps the gas bearing assembly 170 with respect to the axial direction L of the rotation shaft 110 such that the gas bearing assembly 170 is prevented from being detached from the gas bearing bracket 161' along the second direction.

In one example, referring to FIG. 11, the snap ring 165 may perform the function of the first step 162 of the gas bearing bracket 161 illustrated in FIG. 1. That is, the snap ring 165 provides a predetermined clearance space in which the gas bearing assembly 170 may move along the axial direction L of the rotation shaft 110, and in the normal state 165S, at least a portion of the snap ring 165 overlaps the gas bearing assembly 170 with respect to the axial direction L of the rotation shaft 110 such that the gas bearing assembly 170 is prevented from being detached from the gas bearing bracket 161' along the first direction.

That is, referring to FIGS. 7 and 11 together, the gas bearing bracket 161' includes the installation groove 164 recessed in the predetermined width along the radial direction of the rotation shaft 110 from the inner circumferential face of the gas bearing bracket 161'. Further, the installation groove 164 may be defined at a position biased further in the second direction with respect to the axial direction L of the rotation shaft 110, that is, a position relatively far from the rotor 130 (see 164 of FIG. 7), or a position biased further in the first direction with respect to the axial direction L of the rotation shaft 110, that is, a position adjacent to the rotor 130 (see 164' in FIG. 11).

Specifically, as shown in FIG. 7, when the installation groove 164 and the snap ring 165 are biased in the second direction in the gas bearing bracket 161', the snap ring 165 may enter the gas bearing bracket 161' along the first direction (i.e., from bottom to top based on to the drawing). Conversely, as shown in FIG. 11, when the installation groove 164' and the snap ring 165 are biased in the first direction in the gas bearing bracket 161', the snap ring 165 may enter the gas bearing bracket 161' along the second direction (i.e., from top to bottom).

In one example, as shown in FIG. 1, when using the fixed member 180 to prevent the movement of the gas bearing assembly 170 in the axial direction L, the gas bearing bracket 161 and the fixed member 180 are required to prevent the movement of the gas bearing assembly 170 in the axial direction L, and the gas bearing bracket 161 and the fixed member 180 may be fastened to each other through the separate fastening member (not shown).

In one example, as shown in FIGS. 7 and 11, when preventing the movement of the gas bearing assembly 170 in the axial direction L using the snap ring 165, without fastening the fixed member 180 to the gas bearing bracket 161 using the separate fastening member, the snap ring 165 is simply inserted into the gas bearing bracket 161' in the compressed state 165C, and then is seated in the installation groove 164 or 164' in the normal state 165S, which is the expanded state, thereby achieving an intended purpose.

Hereinafter, a method for manufacturing the motor assembly 100 shown in FIGS. 6 to 11 will be described in detail with reference to FIG. 12.

Figure 12:
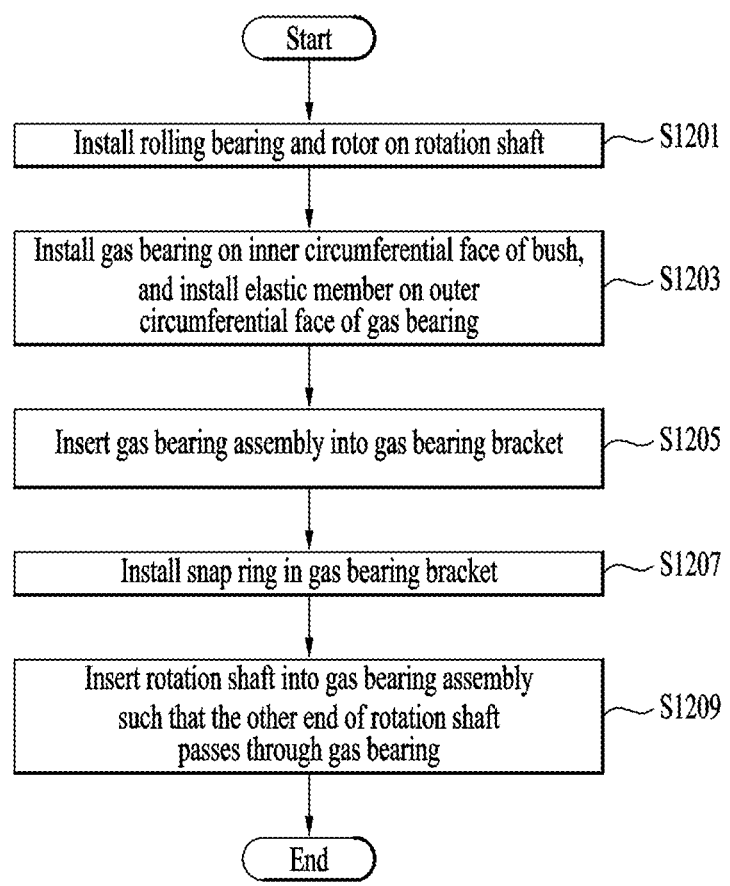
FIG. 12 is a flowchart schematically illustrating a method for manufacturing the motor assembly shown in FIG. 6.

FIG. 12 is a flowchart schematically illustrating a method for manufacturing the motor assembly shown in FIG. 6.

Referring to FIG. 12, a method for manufacturing the motor assembly 100 may include installing the rolling bearing 150 and the rotor 130 on the rotation shaft 110 (S1201), installing the gas bearing 171 on the inner circumferential face of the bush 173, and installing the elastic member 172 on the outer circumferential face of the gas bearing 171 (S1203), inserting the gas bearing assembly 170 into the gas bearing bracket 161' (S1205), installing the snap ring 165 in the gas bearing bracket 161' (S1207), and inserting the rotation shaft 110 into the gas bearing assembly 170 such that the other end 110D of the rotation shaft 110 passes through the gas bearing 171 (S1209).

Specifically, the installing of the rolling bearing 150 and the rotor 130 on the rotation shaft 110 (S1201) may be performed by installing the rolling bearing 150 at the one side 110A of the rotation shaft 110 and installing the rotor 130 at the other side 110 of the rotation shaft 110. In this connection, the rolling bearing 150 may be installed on a portion of the rotation shaft 110 to surround the outer circumferential face of the first support 112 of the rotation shaft 110, and the rotor 130 may be installed on another portion of the rotation shaft 110 to surround the outer circumferential face of the rotor coupling portion 113 of the rotation shaft 110.

In one example, the installing of the gas bearing 171 on the inner circumferential face of the bush 173, and the installing of the elastic member 172 on the outer circumferential face of the gas bearing 171 (S1203) may be performed by inserting the gas bearing 171 into the through hole defined at the center of the bush 173 and press-fitting and fixing the gas bearing 171 on the inner circumferential face of the bush 173, and by seating the first sub-elastic member 1721 and the second sub-elastic member 1722 respectively in the first sub-fixing groove 1741 and the second sub-fixing groove 1742 defined in the outer circumferential face of the bush 173.

As such, when the two elastic members 1721 and 1722 are interposed between the gas bearing bracket 161 and the gas bearing assembly 170 along the axial direction L of the rotation shaft 110, in the gas bearing bracket 161, the gas bearing assembly 170 may move the predetermined distance only along the axial direction L of the rotation shaft 110 without being eccentric or biased to one side, so that the gas bearing assembly 170 may be more stably aligned.

As such, the gas bearing 171 is installed on the inner circumferential face of the bush 173 and the elastic member 172 is installed on the outer circumferential face of the bush 173, so that the gas bearing 171, the elastic member 172, and the bush 173 may be fastened to each other to be assembled into the gas bearing assembly 170 that functions as the contactless gas bearing for supporting the second support 114 of the rotation shaft 110 in the radial direction R of the rotation shaft 110.

Next, in the inserting of the gas bearing assembly 170 into the gas bearing bracket 161' (S1205), the direction in which the gas bearing assembly 170 is inserted into the gas bearing bracket 161' may vary depending on where the installation groove 164 is defined in the gas bearing bracket 161'.

For example, as shown in FIG. 7, when the installation groove 164 is biased in the second direction in the gas bearing bracket 161', the gas bearing assembly 170 may enter the gas bearing bracket 161' along the first direction.

Conversely, as shown in FIG. 11, when the installation groove 164' is biased in the first direction in the gas bearing bracket 161', the gas bearing assembly 170 may enter the gas bearing bracket 161' along the second direction.

Further, in the installing of the snap ring 165 in the gas bearing bracket 161' (S1207), the direction in which the snap ring 165 is inserted into the gas bearing bracket 161' may vary depending on where the installation grooves 164 and 164' are defined in the gas bearing bracket 161'.

For example, as shown in FIG. 7, when the installation groove 164 is biased in the second direction in the gas bearing bracket 161', the snap ring 165 is inserted into the gas bearing bracket 161' along the first direction in the compressed state 165C, and then is seated in the installation groove 164 in the normal state 165S, which is the expanded state.

Conversely, as shown in FIG. 11, when the installation groove 164' is biased in the first direction in the gas bearing bracket 161', the snap ring 165 is inserted into the gas bearing bracket 161' along the second direction in the compressed state 165C, expanded in the installation groove 164', and then seated in the installation groove 164' in the normal state 165S.

Further, the inserting of the rotation shaft 110 into the gas bearing assembly 170 such that the other end 110D of the rotation shaft 110 passes through the gas bearing 171 (S1209) may be performed in a scheme for installing the rotation shaft 110 in the gas bearing assembly 170 by approaching the rotation shaft 110 toward the gas bearing assembly 170 such that the other end 110D of the rotation shaft 110 on which the rolling bearing 150 and the rotor 130 are installed passes through the gas bearing 171 along the second direction in a state in which the gas bearing assembly 170 is seated in the gas bearing bracket 161' and the snap ring 165 is installed in the gas bearing bracket 161' as described above.

In this connection, the inserting of the rotation shaft 110 into the gas bearing assembly 170 does not mean coupling the rotation shaft 110 and the gas bearing assembly 170 with each other, but means positioning a portion of the rotation shaft 110, that is, the second support 114 of the rotation shaft 110 in the space defined inside the gas bearing 171.

In other words, when the rotation shaft 110 is inserted into the gas bearing assembly 170, the gas bearing 171 may surround the circumference of the second support 114 of the rotation shaft 110, but the predetermined gap may be defined such that, but, when the rotation shaft 110 rotates, the gas with the high pressure may flow between the outer circumferential face of the second support 114 and the inner circumferential face of the gas bearing 171 to serve as the bearing.

In one example, although not separately shown in the drawing, before the installing of the rotation shaft 110 into the gas bearing assembly 170 (S1209), seating the rolling bearing 150 installed on the rotation shaft 110 in the rolling bearing bracket 190, installing the diffuser 195 on the rolling bearing bracket 190, and installing the stator 140 on the inner circumferential face of the motor housing 160 may be further performed.

Specifically, before the installing of the rotation shaft 110 in the gas bearing assembly 170 (S1209), that is, before the other end 110D of the rotation shaft 110 passes through the gas bearing 171, the stator 140 may be installed on the inner circumferential face of the motor housing 160. This means that the bearing is not installed at the other side 110B of the rotation shaft 110 when the rotation shaft 110 passes through the stator 140.

This means that the size of the bearing does not need to be smaller than the inner diameter of the stator 140 in designing the bearing structure that supports the other side 110B of the rotation shaft 110, especially in determining the size of the bearing. Accordingly, the outer diameter of the gas bearing assembly 170 supporting the other side 110B of the rotation shaft 110, that is, the second support 114, may be larger than the inner diameter of the stator 140. In one example, in determining the outer diameter of the gas bearing assembly 170, it is not necessary to consider the inner diameter of the stator 140, so that the outer diameter of the gas bearing assembly 170 may be smaller than the inner diameter of the stator 140.

The outer diameter of the gas bearing assembly 170 may be selected to have the outer diameter larger than the inner diameter of the stator 140 so as to stably bear the rotational load of the rotation shaft 110 and at the same time ensure sufficient life, and simultaneously, selected to have the outer diameter smaller than the inner diameter of the stator 140 when it is necessary in consideration of the trend of the weight lightening and the miniaturization of the motor assembly 100. Thus, the size of the bearing may be freely selected based on the required performance of the motor assembly 100.

In addition, although not separately shown in the drawing, after the installing of the rotation shaft 110 into the gas bearing assembly 170 (S1209), fastening the inlet body 105 for accommodating the one side 110A of the rotation shaft 110, the impeller 120, the rolling bearing 150, the rolling bearing bracket 190, and the diffuser 195 therein with the motor housing 160 accommodating the other side 110B of the rotation shaft 110, the rotor 130, the stator 140, and the gas bearing assembly 170 therein to complete the manufacture of the motor assembly 100 may be further performed.

As such, a portion of the rotation shaft 110 at aside opposite to the impeller 120 relative to the rotor 130, specifically the second support 114, is supported by the gas bearing 171 having the theoretically infinite life and at the same time having the volume smaller than that of the general rolling bearing 150, so that the lives of the bearings are sufficiently secured, and at the same time, the trend of the miniaturization and the weight lightening of the motor assembly 100 may be reflected.

In addition, the both sides of the rotation shaft 110 are respectively supported by the rolling bearing 150 and the gas bearing assembly 170 along the axial direction L of the rotation shaft 110, so that the rotation shaft 110 that rotates at the high speed may be stably supported, thereby ensuring the reliability and the durability of the bearing structure.

Effects as not described herein may be derived from the above configurations. The relationship between the above-described components may allow a new effect not seen in the conventional approach to be derived.

In addition, embodiments shown in the drawings may be modified and implemented in other forms. The modifications should be regarded as falling within a scope of the present disclosure when the modifications are carried out so as to include a component claimed in the claims or within a scope of an equivalent thereto.

What is claimed is:

1. A motor assembly comprising:
   a motor housing having an inner circumferential face;
   a rotation shaft having a first support portion and a second support portion;
   an impeller mounted on the rotation shaft between the first support portion and the second support portion;
   a rotor mounted on the rotation shaft and spaced apart from the impeller axially along a rotational axis of the rotation shaft;
   a stator surrounding the rotor and spaced apart from the rotor radially relative to the rotational axis of the rotation shaft, wherein the stator is mounted on the inner circumferential face of the motor housing;
   a rolling bearing mounted on the rotation shaft between the impeller and the rotor and rotatably supporting the first support portion of the rotation shaft;
   a gas bearing bracket disposed in the motor housing and receiving the second support portion of the rotation shaft; and
   a gas bearing assembly received in the gas bearing bracket and rotatably supporting the second support portion of the rotation shaft,
   wherein the gas bearing assembly includes:
      a gas bearing surrounding the second support portion of the rotation shaft and configured to be spaced apart from the second support portion of the rotation shaft to define a gap between the gas bearing and the second support portion during rotation of the rotation shaft,
      a bush that surrounds the gas bearing, wherein the gas bearing is press-fitted into an inner circumferential face of the bush, and
      an elastic member interposed between an inner circumferential face of the gas bearing bracket and an outer circumferential face of the gas bearing to elastically support the gas bearing.

2. The motor assembly of claim 1, wherein the rolling bearing is configured to rotatably support the first support portion axially and radially relative to the rotational axis, and
   wherein the gas bearing assembly is configured to rotatably support the second support portion radially relative to the rotational axis of the rotation shaft.

3. The motor assembly of claim 1, wherein the gas bearing bracket includes a first step at least partially covering the gas bearing assembly radially relative to the rotational axis of the rotation axis such that the gas bearing assembly is prevented from being removed axially from the gas bearing bracket along a first direction from the rotor toward the impeller.

4. The motor assembly of claim 3, wherein the gas bearing assembly further includes:
   a fixing groove defined in an outer circumferential face of the bush and configured to seat the elastic member therein,
   wherein the first step of the gas bearing bracket covers at least a portion of the bush radially with respect to the rotational axis of the rotation shaft.

5. The motor assembly of claim 4, wherein the fixing groove includes a first sub-fixing groove and a second sub-fixing groove axially spaced apart from the first sub-fixing groove,
   wherein the elastic member includes a first sub-elastic member seated in the first sub-fixing groove, and a second sub-elastic member seated in the second sub-fixing groove.

6. The motor assembly of claim 4, wherein an inner diameter of the first step is smaller than an outer diameter of the bush, and is larger than an inner diameter of the bush.

7. The motor assembly of claim 4, wherein the gas bearing is made of one or more materials including at least one of aluminum, brass, bronze, or a nickel-chromium alloy, and
wherein the bush is made of one or more materials including a synthetic resin.

8. The motor assembly of claim 4, further comprising:
a stopper coupled with the gas bearing bracket and configured to provide a space within which the gas bearing assembly moves axially along the rotational axis of the rotation shaft, wherein the stopper includes a second step that at least partially covers the gas bearing assembly radially with respect to the rotational axis of the rotation shaft and configured to prevent the gas bearing assembly from being removed axially from the gas bearing bracket along a second direction from the impeller toward the rotor.

9. The motor assembly of claim 8, wherein an inner diameter of the stopper is equal to an inner diameter of the gas bearing bracket, and
wherein an inner diameter of the second step is smaller than an outer diameter of the bush, and larger than an inner diameter of the bush.

10. The motor assembly of claim 1, wherein the gas bearing bracket includes:
an installation groove recessed from an inner circumferential face of the gas bearing bracket radially relative to the rotational axis of the rotation shaft; and
a snap ring engaged with the installation groove.

11. The motor assembly of claim 10, wherein the snap ring is elastically deformable by an externally applied force.

12. The motor assembly of claim 11, wherein the snap ring has a diameter equal to or smaller than a diameter of the inner circumferential face of the gas bearing bracket.

13. The motor assembly of claim 11, wherein the snap ring is configured to a predetermined clearance space in which the gas bearing assembly moves axially along the rotational axis of the rotation shaft, wherein at least a portion of the snap ring that is not deformed by the externally applied force at least partially covers the gas bearing assembly radially with respect to the rotational axis of the rotation shaft such that the gas bearing assembly is prevented from being removed axially from the gas bearing bracket along the rotational axis of the rotation shaft.

14. A method for manufacturing a motor assembly, the method comprising:
mounting a rolling bearing on a first portion of a rotation shaft;
mounting a rotor on a second portion of the rotation shaft;
mounting a gas bearing on an inner circumferential face of a bush and installing an elastic member on an outer circumferential face of the bush to assembly a gas bearing assembly;
inserting the gas bearing assembly into a gas bearing bracket; and
inserting the rotation shaft into the gas bearing assembly such that the second portion of the rotation shaft passes through the gas bearing along a first direction from the first portion to the second portion of the rotation shaft while the rolling bearing and the rotor are mounted on the rotation shaft,
wherein the inserting of the gas bearing assembly into the gas bearing bracket includes:
inserting the gas bearing assembly into the gas bearing bracket in a second direction from the second portion to the first portion of the rotation shaft.

15. The method of claim 14, further comprising:
after the inserting of the gas bearing assembly into the gas bearing bracket, arranging a stopper toward the gas bearing bracket in a second direction from the second portion to the first portion of the rotation shaft; and
fastening the stopper to the gas bearing bracket.

16. The method of claim 14, further comprising:
after the inserting of the gas bearing assembly into the gas bearing bracket, arranging a snap ring toward the gas bearing bracket to mount the snap ring in an installation groove recessed from an inner circumferential face of the gas bearing bracket.

17. The method of claim 16, wherein the installing of the snap ring in the installation groove of the gas bearing bracket includes:
compressing the snap ring by pressing the snap ring such that a diameter of the snap ring becomes equal to or smaller than an inner diameter of the inner circumferential face of the gas bearing bracket;
guiding the compressed snap ring toward the installation groove along the inner circumferential face of the gas bearing bracket; and
expanding the snap ring to permit for the snap ring to be inserted into the installation groove, such that the snap ring is fixed in the installation groove.

18. The method of claim 14, further comprising:
before the mounting of the rotation shaft into the gas bearing assembly,
seating the rolling bearing mounted on the rotation shaft in a rolling bearing bracket;
mounting a diffuser on the rolling bearing bracket;
mounting an impeller on the first portion of the rotation shaft to be axially opposite to the rotor relative to the rolling bearing; and
mounting a stator on an inner circumferential face of a motor housing.

19. The method of claim 18, further comprising:
after the mounting of the rotation shaft into the gas bearing assembly,
fastening an inlet body with the motor housing, wherein the inlet body is configured to receive the first portion of the rotation shaft, the impeller, the rolling bearing, the rolling bearing bracket, and the diffuser therein, and wherein the motor housing is configured to receive the second portion of the rotation shaft, the rotor, the stator, and the gas bearing assembly therein.

* * * * *